United States Patent
Su et al.

(10) Patent No.: US 10,630,867 B2
(45) Date of Patent: Apr. 21, 2020

(54) PERCEPTUAL HUE PRESERVED COLOR-GAMUT TRANSFERRING IN NON-UNIFORM CIE-1931 COLOR SPACE

(71) Applicant: Samsung Electronics Co., Ltd., Suwon-si, Gyeonggi-do (KR)

(72) Inventors: Chang Su, Foothill Ranch, CA (US); Li Tao, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 16/216,171

(22) Filed: Dec. 11, 2018

(65) Prior Publication Data

US 2020/0092441 A1     Mar. 19, 2020

Related U.S. Application Data

(60) Provisional application No. 62/732,221, filed on Sep. 17, 2018.

(51) Int. Cl.
     *H04N 1/60*          (2006.01)

(52) U.S. Cl.
     CPC ......... *H04N 1/6061* (2013.01); *H04N 1/6019* (2013.01); *H04N 1/6097* (2013.01)

(58) Field of Classification Search
None
See application file for complete search history.

(56) References Cited

U.S. PATENT DOCUMENTS

| | | | |
|---|---|---|---|
| 5,299,291 A | 3/1994 | Ruetz | |
| 5,450,216 A | 9/1995 | Kasson | |
| 5,574,666 A | 11/1996 | Ruetz et al. | |
| 7,356,181 B2 * | 4/2008 | Haikin | ............ G06T 11/001 382/167 |
| 7,573,610 B2 | 8/2009 | Um et al. | |
| 7,583,406 B2 | 9/2009 | Spaulding et al. | |
| 8,026,953 B2 | 9/2011 | Lammers et al. | |

(Continued)

FOREIGN PATENT DOCUMENTS

CN      108259701 A      7/2018

OTHER PUBLICATIONS

Bronner, T-F. et al. "Evaluation of Color Mapping Algorithms in Different Color Spaces," Applications of Digital Processing XXXIX, 2016, pp. 1-11, vol. 9971, International Society for Optics and Photonics, United States.

(Continued)

*Primary Examiner* — Dung D Tran
(74) *Attorney, Agent, or Firm* — Sherman IP LLP; Kenneth L. Sherman; Steven Laut

(57) ABSTRACT

A perceptual hue preserved (PHP) color gamut transferring (CGT) method carried out in CIE-1931 color space includes obtaining a target gamut based on a rendering device of a content. Multiple color-moving constraints (CMC) are retrieved from a dataset. Perceptually consistent hue loci (PCHL) of out-of-gamut (OOG) colors of the content are estimated according to the CMC and a protection zone boundary. Each of the OOG colors are moved along its PCHL to a final point inside the target gamut based on a CGT plan data. The CGT plan data includes target and source boundary information formed using the CMC and the protection zone boundary.

20 Claims, 18 Drawing Sheets

(11 of 18 Drawing Sheet(s) Filed in Color)

(56) References Cited

U.S. PATENT DOCUMENTS

| | | | |
|---|---|---|---|
| 8,049,765 B2* | 11/2011 | Ahn | G09G 5/02 |
| | | | 345/589 |
| 8,243,090 B2 | 8/2012 | Scheibe | |
| 8,411,022 B2* | 4/2013 | Brown | G09G 3/3426 |
| | | | 345/102 |
| 8,520,938 B2 | 8/2013 | Rozzi et al. | |
| 8,890,884 B2 | 11/2014 | Zhang | |
| 8,937,746 B2 | 1/2015 | Maltz et al. | |
| 9,179,042 B2 | 11/2015 | Atkins | |
| 9,190,014 B2* | 11/2015 | Messmer | H04N 1/6058 |
| 9,432,554 B2 | 6/2016 | Doser et al. | |
| 9,466,260 B2 | 10/2016 | Higgins | |
| 9,472,162 B2 | 10/2016 | Stauder et al. | |
| 9,489,919 B2 | 11/2016 | Wang et al. | |
| 9,552,793 B2 | 1/2017 | Chun et al. | |
| 9,583,035 B2 | 2/2017 | Buckley et al. | |
| 9,600,906 B2 | 3/2017 | Sakai | |
| 9,646,392 B2 | 5/2017 | Li et al. | |
| 9,661,187 B1 | 5/2017 | Chen | |
| 10,129,558 B2 | 11/2018 | Ramasubramonian et al. | |
| 2005/0276474 A1 | 12/2005 | Um et al. | |
| 2009/0040564 A1 | 2/2009 | Granger | |
| 2013/0176326 A1* | 7/2013 | Safaee-Rad | G06T 11/001 |
| | | | 345/590 |
| 2016/0309154 A1 | 10/2016 | Rusanovskyy et al. | |
| 2017/0048561 A1 | 2/2017 | Oh et al. | |
| 2017/0163851 A1 | 6/2017 | Yamada | |
| 2017/0272780 A1 | 9/2017 | Pan et al. | |
| 2018/0139360 A1 | 5/2018 | Francois et al. | |
| 2018/0300862 A1* | 10/2018 | Keating | H04N 1/6058 |
| 2018/0352257 A1* | 12/2018 | Leleannec | H04N 19/30 |

OTHER PUBLICATIONS

Azimi, M., et al., "A Color Gamut Mapping Scheme for Backward Compatible UHD Video Distribution," IEEE ICC Communications Software, Services, and Multimedia Applications Symposium, 2017, pp. 2-5, IEEE, United States.

Sikudova, E., et al., "A Gamut-Mapping Framework for Color-Accurate Reproduction of HDR Images," Jul.-Aug. 2016, pp. 78-90, IEEE Computer Society, United States.

Morovic, J., et al., "Calculating Medium and Image Gamut Boundaries for Gamut Mapping," Dec. 2000, pp. 394-401, Colour & Imaging Institute, v. 25, No. 6, United Kingdom.

Sharma, G., et al., "The CIEDE2000 Color-Difference Formula: Implementation Notes, Supplementary Test Data, and Mathematical Observations," Feb. 2005, pp. 21-30, vol. 30, No. 1, Wiley Periodicals, Inc., United States.

Froehlich, J., et al., "Creating Cinematic wide gamut HDR-video for the evaluation of tone mapping operators and HDR-Displays," Digital Photography X, 2014, pp. 1-10, International Society for Optics and Photonics, United States.

Yang, C.C, et al., "Gamut Clipping in Color Image Processing," IEEE, 2000, pp. 824-827, United States.

Azimi, M. et al., "A Hybrid Approach for Efficient Color Gamut Mapping," pp. 1-2, 2017 IEEE International Conference on Consumer Electronics (ICCE), United States.

SMPTE RP 177-1993, "Derivation of Basic Television Color Equations," Society of Motion Pictures & Television Engineers, Inc., 1993, pp. 1-4, White Plains, NY.

Masaoka, K., et al., "Algorithm Design for Gamut Mapping From UHDTV to HDTV," Journal of Display Technology, Jul. 2016, pp. 760-769, vol. 12, No. 7, IEEE, United States.

Yuan, J. et al., "Development and Evaluation of a Hybrid Point-wise Gamut Mapping Framework," Colour and Visual Computing Symposium (CVCS), 2015, pp. 1-4, IEEE, United States.

Fairchild, M.D., "Color Appearance Models," 2005, pp. 1-409, Second Edition, John Wiley & Sons, Ltd., United States.

Borg, L., "SMPTE ST 2094 and Dynamic Metadata," SMPTE Standards Webcast Series, 2017, pp. 1-15, Society of Motion Pictures & Television Engineers, Inc.

* cited by examiner

PERCEPTUAL HUE PRESERVED COLOR-GAMUT TRANSFERRING IN NON-UNIFORM CIE-1931 COLOR SPACE

CROSS-REFERENCE TO RELATED APPLICATIONS

This application claims the priority benefit of U.S. Provisional Patent Application Ser. No. 62/732,221, filed Sep. 17, 2018, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to color gamut matching, and in particular, to color gamut matching in high-dynamic range (HDR)$10^+$ applications, and all real-time HDR broadcasting/distribution applications.

BACKGROUND

High-dynamic range (HDR) and wide-color gamut (WCG) contents become more and more popular in broadcasting industries. User-end displays, however, only have limited color volume capacities. As an example, international telecommunication union (ITU) broadcast television 2020 (ITU-BT.2020) gamut is widely adopted in color grading by HDR contents creators. The gamut covers 75.8% commission on illumination (CIE) 1931 (CIE-1931) color space. But an HDR television (TV) with digital cinema initiatives (DCI) P3 (DCI-P3) gamut only covers 53.6% CIE-1931 space. Still widely existing standard dynamic range (SDR) TVs (SDR-TVs) with ITU-BT.709 gamut only covers 35.9% CIE-1931 space. Directly displaying the WCG contents on a user-end display may lead to serious hue/saturation distortions and high-visual impacts due to the out-of-gamut (OOG) colors. An effective color-gamut transferring (CGT) method is necessary to rendering WCG contents well on user-end displays.

Conventional CGT technologies cannot satisfy the fast developing HDR broadcasting/distribution markets. The simple and economic gamut clipping based techniques such as the color-space conversion (CSC) based CGT are low-cost, but may generate serious artifacts in converted colors, including clipping halos/edges, salt-pepper spots, or loss of details. High-performance color gamut mapping (CGM) and compression (CGC) techniques generally can obtain visually pleasing colors, but these are mostly based on color-appearance models, which require many complex and non-linear computations such as trigonometric or exponential calculations involved. This makes the CGM/CGC techniques very complex and computationally expensive. Therefore, those techniques are seldom adopted in industrial products.

SUMMARY

One or more embodiments relate to color gamut transferring (CGT). In some embodiments, a perceptual hue preserved (PHP) CGT method carried out in CIE-1931 color space includes obtaining a target gamut based on a rendering device of a content. The method further includes retrieving multiple color-moving constraints (CMC) from a dataset. Perceptually consistent hue loci (PCHL) of out-of-gamut (OOG) colors of the content are estimated according to the CMC and a protection zone boundary. Each of the OOG colors are moved along its PCHL to a final point inside the target gamut based on a PHP CGT plan data. The PHP CGT plan data includes target and source boundary information formed using the CMC and the protection zone boundary.

In some embodiments, a non-transitory processor-readable medium that includes a program that when executed by a processor performs a PHP CGT method, carried out in CIE-1931 color space, comprising: obtaining a target gamut based on a rendering device of a content; retrieving a plurality of CMC from a dataset; estimating PCHL of OOG colors of the content according to the CMC and a protection zone boundary; and moving each of the OOG colors along its PCHL to a final point inside the target gamut based on a PHP CGT plan data. The PHP CGT plan data includes target and source boundary information formed using the CMC and the protection zone boundary.

In some embodiments, an apparatus comprises a memory storing instructions. At least one processor executes the instructions including a process configured to: obtain a target gamut based on a rendering device of a content; retrieve a plurality of CMC from a dataset; estimate PCHL of OOG colors of the content according to the CMC and a protection zone boundary; and move each of the OOG colors along its PCHL to a final point inside the target gamut based on a PHP CGT plan data. The PHP CGT plan data includes target and source boundary information formed using the CMC and the protection zone boundary.

These and other features, aspects and advantages of the one or more embodiments will become understood with reference to the following description, appended claims and accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
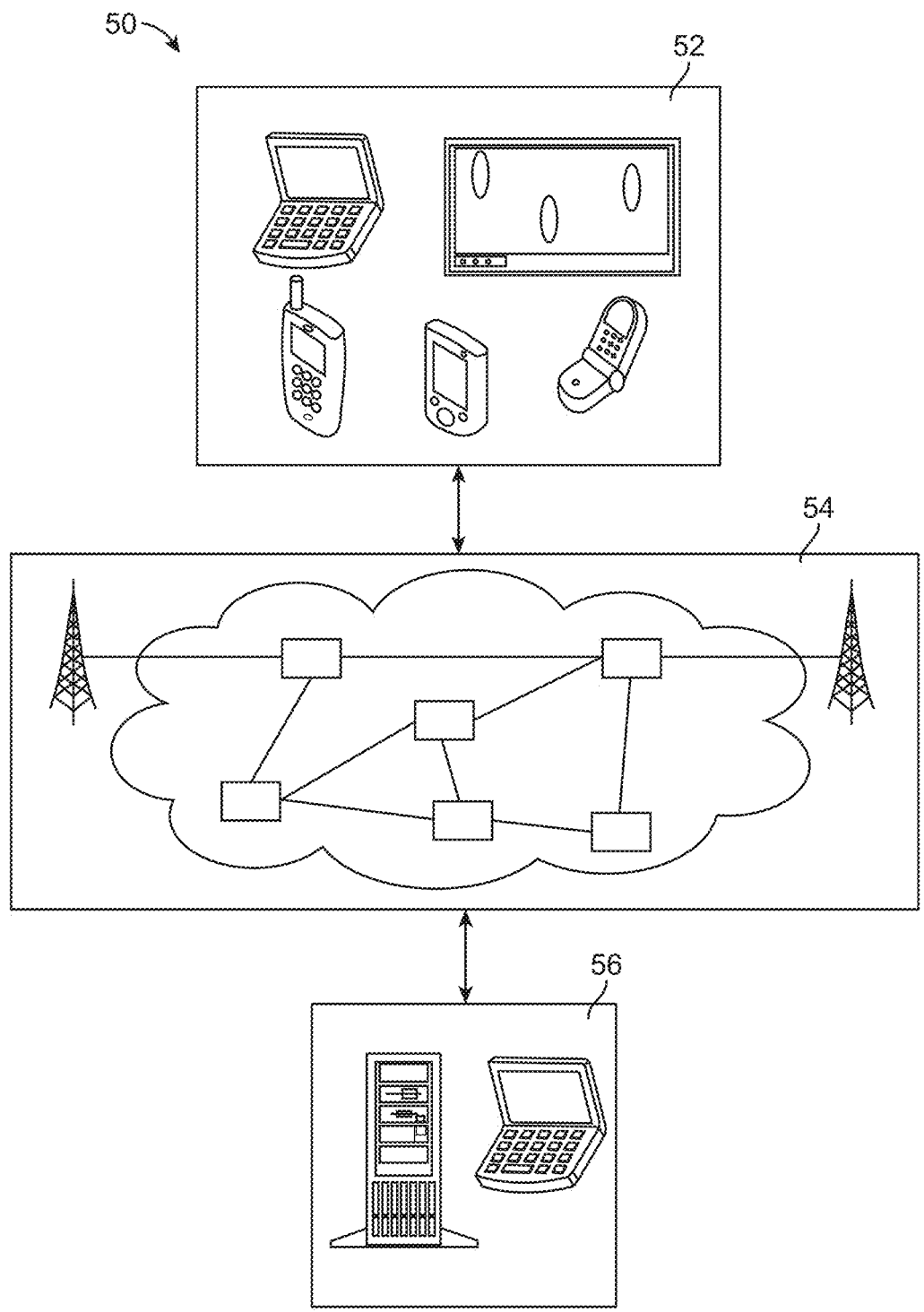
FIG. 1 shows an electronic system that may be implemented with perceptual hue preserved (PHP) color gamut transferring (CGT) in non-uniform commission on illumination (CIE) 1931 (CIE-1931) color space, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Some embodiments provide perceptual hue preserved (PHP) color gamut transferring (CGT) processing. In some embodiments, a CGT method carried out in commission on illumination (CIE) 1931 (CIE-1931) CIE-1931 color space includes obtaining a target gamut based on a rendering device of a content. The method further includes retrieving multiple color-moving constraints (CMC) from a dataset. Perceptually consistent hue loci (PCHL) of out-of-gamut (OOG) colors of the content are estimated according to the CMC and a protection zone boundary. Each of the OOG colors are moved along its PCHL to a final point inside the target gamut based on a PHP CGT plan data. The PHP CGT plan data includes target and source boundary information formed using the CMC and the protection zone boundary.

The term "image" referred to herein may include a two-dimensional image, three-dimensional image, video frame, a computer file representation, an image from a camera, a video frame, or a combination thereof. For example, the image may be a machine readable digital file, a physical photograph, a digital photograph, a motion picture frame, a video frame, an x-ray image, a scanned image, or a combination thereof. The image may be generated from pixels arranged in a rectangular array. The image may include an x-axis along the direction of the rows and a y-axis along the direction of the columns. The term "image" may indicate a still image or a moving picture of a video, i.e., the latter indicating the video itself. The term "image" may include a partial or the entire screen image displayable on a display besides a still image (e.g., a photograph) or a video. In addition, the term "image" may also originally include a displayable screen image itself such as a user interface or a webpage besides a still image (e.g., a photograph) or a video.

Some embodiments provide an effective and economic PHP CGT technique that maps the colors in a source gamut to the colors of a target gamut without introducing any visible hue distortion and high visual impacts. Some implementations include two parts, namely 1) off-line processing 210 (FIG. 2) that prepares the necessary datasets for PHP CGT processing, and only needs to be carried out one time, and 2) the in-line PHP CGT processing 220 that transfers out-of-gamut colors to the colors of user-desired gamut using the datasets obtained in part 1.

In some embodiments, first the datasets that are necessary to PHP CGT, including the color-gamut boundaries (CGB) descriptors and color-moving constraints (CMC), are obtained in the off-line processing. The CGB descriptors are obtained from the sampled source and the target gamut plans in different luminance layers. The CMC are computed from the obtained CGB and the perceptually consistent hue loci (PCHL) represented in the CIE-1931 space. Lastly, due to the high data redundancy of the CGB and the CMC between neighboring luminance layers, all data are packed into a small-sized 3D lookup table (LUT) for future reference.

The CIE-1931 space is non-uniform. A small color offset may lead to a large perceptual color difference. Without effective constraints, moving colors in a non-uniform space has a risk of huge hue distortions. Some embodiments introduce a set of effective CMC that maintain the hue consistency in color moving in the non-uniform CIE-1931 space.

An important idea to perceptual hue-distortion free CGT is that if an out of gamut (OOG) color is moved along its PCHL, no visible hue distortion will be introduced into the converted colors. In some embodiments, a color system is used that results in PCHL, which is designed based on rigorous measurements of human subjects' visual responses to colors.

Figure 8:
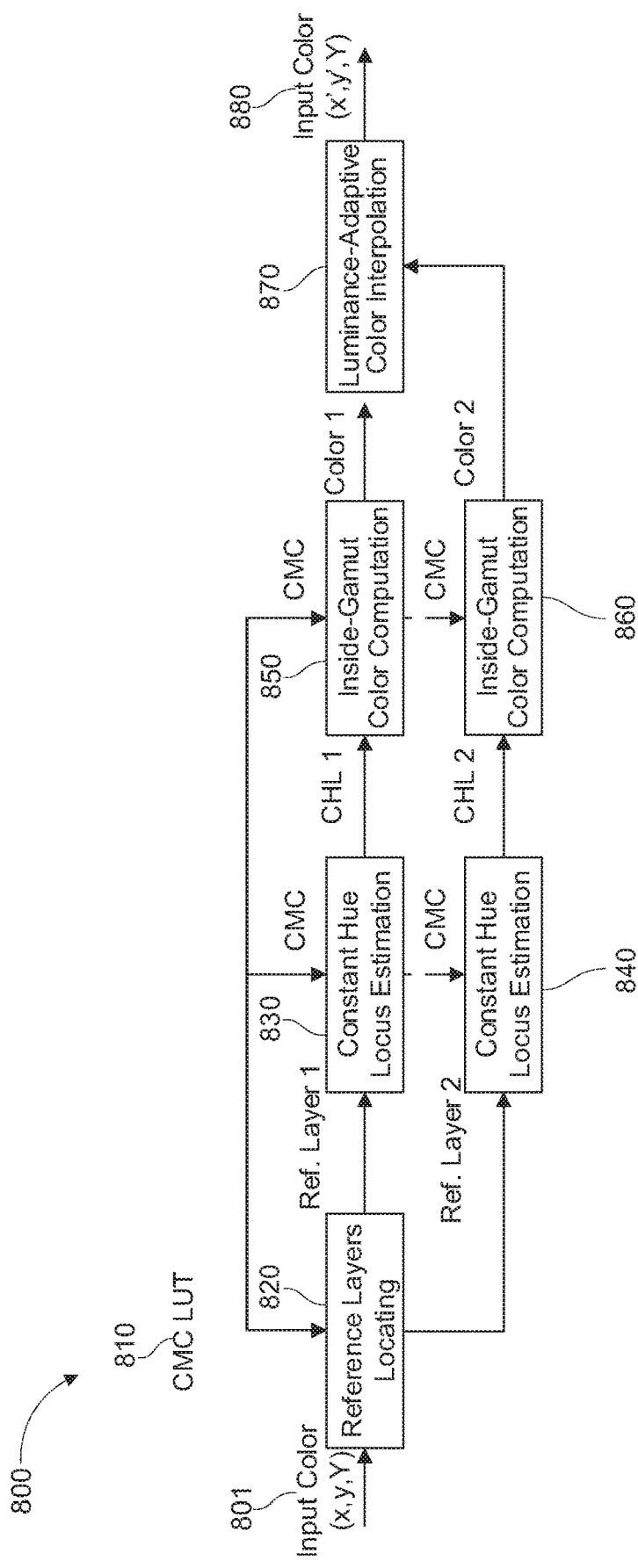
FIG. 8 shows a high-level flow for PHP CGT processing, according to some embodiments.
Figure 14:
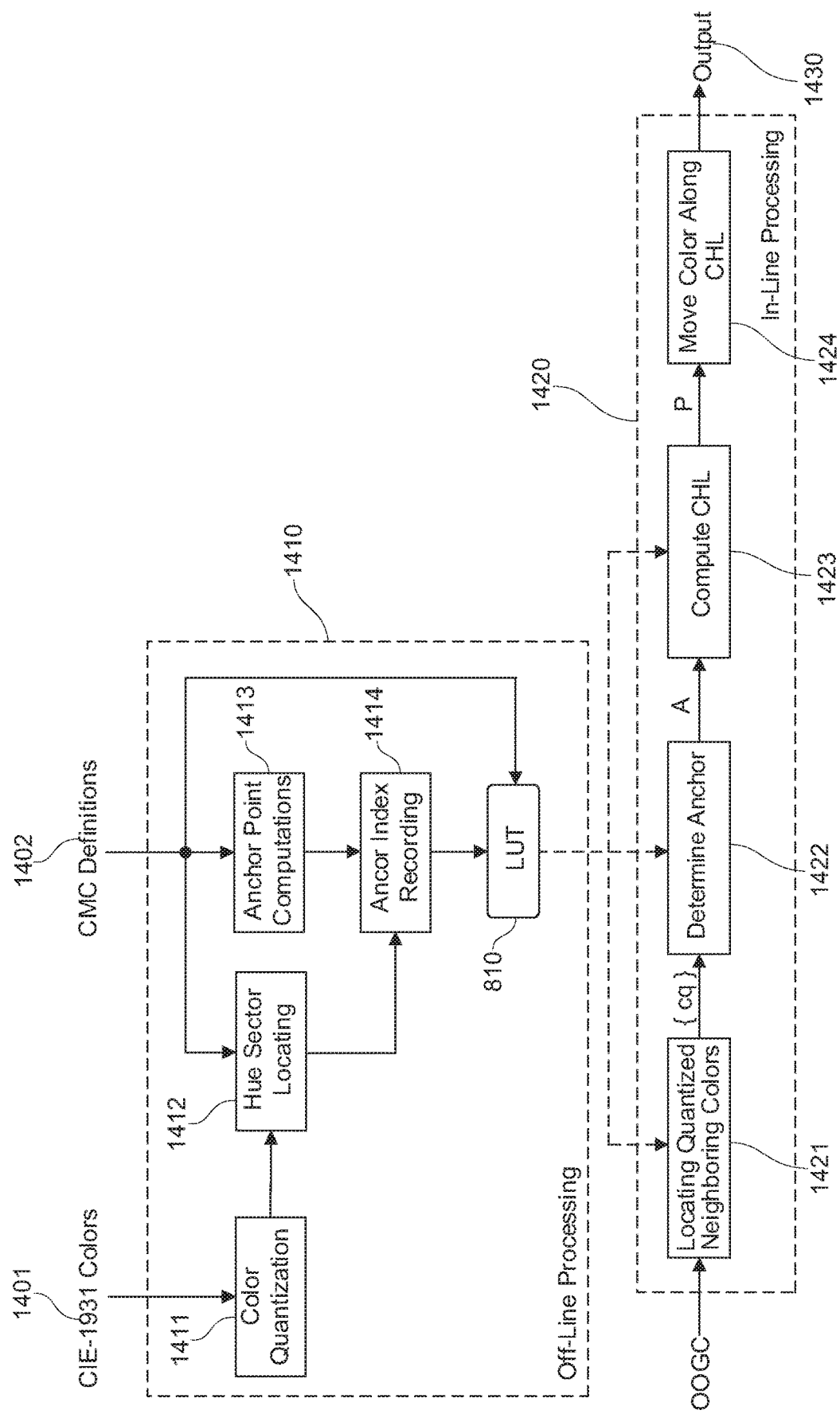
FIG. 14 shows a block diagram of an example hardware implementation layout, according to some embodiments.

The in-line PHP CGT processing 220 (FIG. 2) moves out-of-gamut colors inside the target gamut with the CMC obtained in the off-line processing 210. To a given OOG color, the in-line PHP CGT processing 220 estimates its constant hue locus according to the CMC stored in the LUT 810 (FIGS. 8 and 14). Then an inside-gamut color can be obtained by moving the OOG color along its constant hue locus to an appropriate point inside the target gamut. In some embodiment, for more accurate output colors, this color moving processing is repeated in two neighboring luminance layers, the final output inside-gamut color is then obtained by color interpolation between the two luminance layers.

Different from the expensive color-appearance model (CAM) based CGM/CMC techniques, some embodiments carry out PHP CGT processing directly in the non-uniform CIE-1931 space with content-robust CMC techniques. Thus, some embodiments greatly decrease the complexity and the computations of the whole system due to the simple CGB in CIE-1931 space, and effectively protects the perceptual hues. Some embodiments effectively convert colors between different gamuts while maintaining their perceptual hues, and without introducing any visible artifacts. Furthermore, some embodiments do not involve complex computations and iterations. This greatly decreases the system complexity and costs. In some embodiments, PHP CGT can be directly adopted in non-uniform CIE-1931 space but achieves the similar performance as the expensive CAM-based CGM/CMC techniques do.

Some embodiments provide: a mechanism that directly carries out PHP CGT in non-uniform CIE-1931 space without introducing perceptible hue distortions and high visual impacts that widely exist in non-uniform space based CGT; a set of effective CMC computed from the source and the target color gamut solids and PCHL that restricts color moving to the corresponding constant hue loci in PHP CGT; a high efficient CGB descriptors and CMC packing strategy that packs abundant CGB descriptors and CMC into small-size LUT, with which PHP CGT can achieve high accuracy in the target gamut; an adaptive color transition/protection zone definition strategy that enables users to control their PHP CGT processing for achieving optimized compromise between saturation preserving and detail protection; a simple and real-time geometric looking up strategy for locating out-of-gamut colors in hue sectors; a simple, accurate, and real-time constant hue loci prediction strategy for any given OOG colors; and a linear 3D color interpolation strategy for obtaining colors with arbitrary luminance but maintaining their perceptual hue and visually pleased saturation.

In some embodiments, advantages over the conventional system includes (but are not limited to): (1) high feasibility for high-performance but economic HDR and wide-color gamut (WCG) commercial applications: directly carries out PHP CGT in non-uniform CIE-1931 space without further conversions, greatly decreases the system complexity and costs; benefited from the linear CGB in CIE-1931 space, all computations are simple. No complex computation such as high-order exponential, logarithm, or trigonometric functions is involved; packs the CGB and CMC with a high efficiency packing strategy, and forms a small-size LUT; (2) accurate, and preserving the perceptual hue in different gamuts: by introducing a set of CMC derived from the PCHL, effectively overcomes the perceptible hue distortion problem of CGT in non-uniform CIE-1931 space; with a hue sector anchor point based constant hue loci prediction strategy, the constant hue loci of arbitrary out-of-gamut colors can be quickly determined; color moving is only carried out along the constant hue loci of out-of-gamut colors, thus avoid perceptible hue distortions; with a real-time 3D cross-layer color interpolation, out-of-gamut colors with arbitrary luminance can be effectively converted into target gamut colors without visible artifacts; and (3) much more efficient and economic processing than any color-appearance model based CGT techniques, but has their similar performance in real-world applications.

The most popular CGT technique in conventional commercial applications is color-space conversion (CSC) followed by color clipping. To a given color of the source gamut, denoted $\Omega_S$, the technique directly computes its corresponding color in the target gamut, denoted $\Omega_T$, by keeping the coordinates of the color in CIE-1931 color space unchanged. The computation can be performed by a 3×3 CSC matrix. Due to its simplicity and efficiency, the CSC-based CGT is very suitable for hardware implementations, and had been widely adopted in broadcasting industries. However, it generally performs poorly in HDR applications. First, the approach moves all OOG colors to the target gamut boundaries without any constraints, and since the CIE-1931 space is non-uniform thus small color offsets may lead to big perceptual color distortions, hue-shifting artifacts are common in the converted colors. Second, due to color clipping, multiple OOG colors in $\Omega_S$ may become a single color, thus color variations are lost, and high visual impacts caused by clipping artifacts may occur in the obtained colors. Although some recent approaches add some constraints, as an example, the relative color positions to the white point, the constraints are not capable of avoiding perceptible hue distortions due to the non-uniformness of CIE-1931 space. Therefore, the economic CSC-based CGT techniques cannot satisfy the fast developing HDR media markets.

Most high-performance conventional CGT techniques adopt CAM to compress the colors in source gamut $\Omega_S$ to the corresponding colors in the target gamut $\Omega_T$. Perceptual uniform spaces such as the CIELAB, CIELCH, IPT, etc., are most popular spaces used in the CAM-based CGT techniques. By performing color moving in luminance-chroma (L-C) plans, CAM-based CGT techniques effectively maintain the perceptual hue unchanged during color conversion. Thus, they generally obtain the visually pleased colors in the target displays. However, the conventional CAM-based CGT approaches are very expensive in both computations and system resource consumption. First, the color coordinates in the non-uniform CIE-1931 space must be converted to the coordinates of a uniform space. Many complex computations such as high-order exponential or trigonometric computations are involved. Second, the gamut boundaries in uniform spaces are non-linear. Huge amount of CGB descriptors are necessary to obtain accurate enough converted colors. The CGB descriptors commonly require large system resources. For example, a recent gamut mapping technique based on the CIELCH space needs to save over 2 million descriptors to describe the non-linear CGB. In a word, the CAM-based CGT techniques are not feasible to economic commercial products.

FIG. 1 shows an electronic system 50 implemented with a mechanism for PHP CGT in non-uniform CIE-1931 color space, according to some embodiments. The electronic system 50 includes a first device 52, such as a client or a server, connected to a second device 56, such as a client or server. The first device 52 may communicate with the second device 56 with a communication path 54, such as a wireless or wired network.

In one example, the first device 52 may be of any of a variety of display devices, such as ultra-high definition (UD), 4K (8K, etc.) display devices, such as a UD television (UDTV), 4K TV, 8K TV, tablet device, smart phone, personal digital assistant (PDA), a notebook computer, a liquid crystal display (LCD) system, a wearable device, mobile computing device, projection device, or other multi-functional displays or entertainment devices. The first device 52 may couple directly or indirectly to the communication path 54 to communicate with the second device 56 or may be a stand-alone device.

For illustrative purposes, the display system 50 is described with the first device 52 as a display device, although it is understood that the first device 52 may be a variety of different types of devices. For example, the first device 52 may also be a device for presenting images or a multi-media presentation. A multi-media presentation may be a presentation including sound, a sequence of streaming images or a video feed, or a combination thereof. As an example, the first device 52 may be a UDTV, or any other type of UD display device (e.g., monitor, video panel, HUD, smart telephone, tablet device, video device, gaming device, etc.).

The second device 56 may be any of a variety of centralized or decentralized computing devices, image or video transmission devices. For example, the second device 56 may be a multimedia computer, a tablet, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, BDP, a recording device, such as a camera or video camera, or a combination thereof. In another example, the second device 56 may be a signal receiver for receiving broadcast or live stream signals, such as a television receiver, STB, a cable box, a satellite dish receiver, or a web enabled device.

The second device 56 may be centralized in a single room, distributed across different rooms, distributed across different geographical locations, embedded within a telecommunications network, etc. The second device 56 may have a means for coupling with the communication path 54 to communicate with the first device 52.

For illustrative purposes, the electronic system 50 is described with the second device 56 as a computing device, although it is understood that the second device 56 may be different types of devices. Also, for illustrative purposes, the display system 50 is shown with the second device 56 and the first device 52 as end points of the communication path 54, although it is understood that the display system 50 may have a different partition between the first device 52, the second device 56, and the communication path 54. For example, the first device 52, the second device 56, or a combination thereof may also function as part of the communication path 54.

The communication path 54 may be a variety of networks. For example, the communication path 54 may include wireless communication, wired communication, optical, ultrasonic, or the combination thereof. Satellite communication, cellular communication, BLUETOOTH®, Infrared Data Association standard (IrDA), wireless fidelity (WiFi), and worldwide interoperability for microwave access (Wi-MAX) are examples of wireless communication that may be included in the communication path 54. Ethernet, digital subscriber line (DSL), fiber to the home (FTTH), high-definition multimedia interface (HDMI) cable, and plain old telephone service (POTS) are examples of wired communication that may be included in the communication path 54.

Further, the communication path 54 may traverse a number of network topologies and distances. For example, the communication path 54 may include direct connection, personal area network (PAN), local area network (LAN), wireless LAN (WLAN), metropolitan area network (MAN), wide area network (WAN), or a combination thereof.

Figure 2:
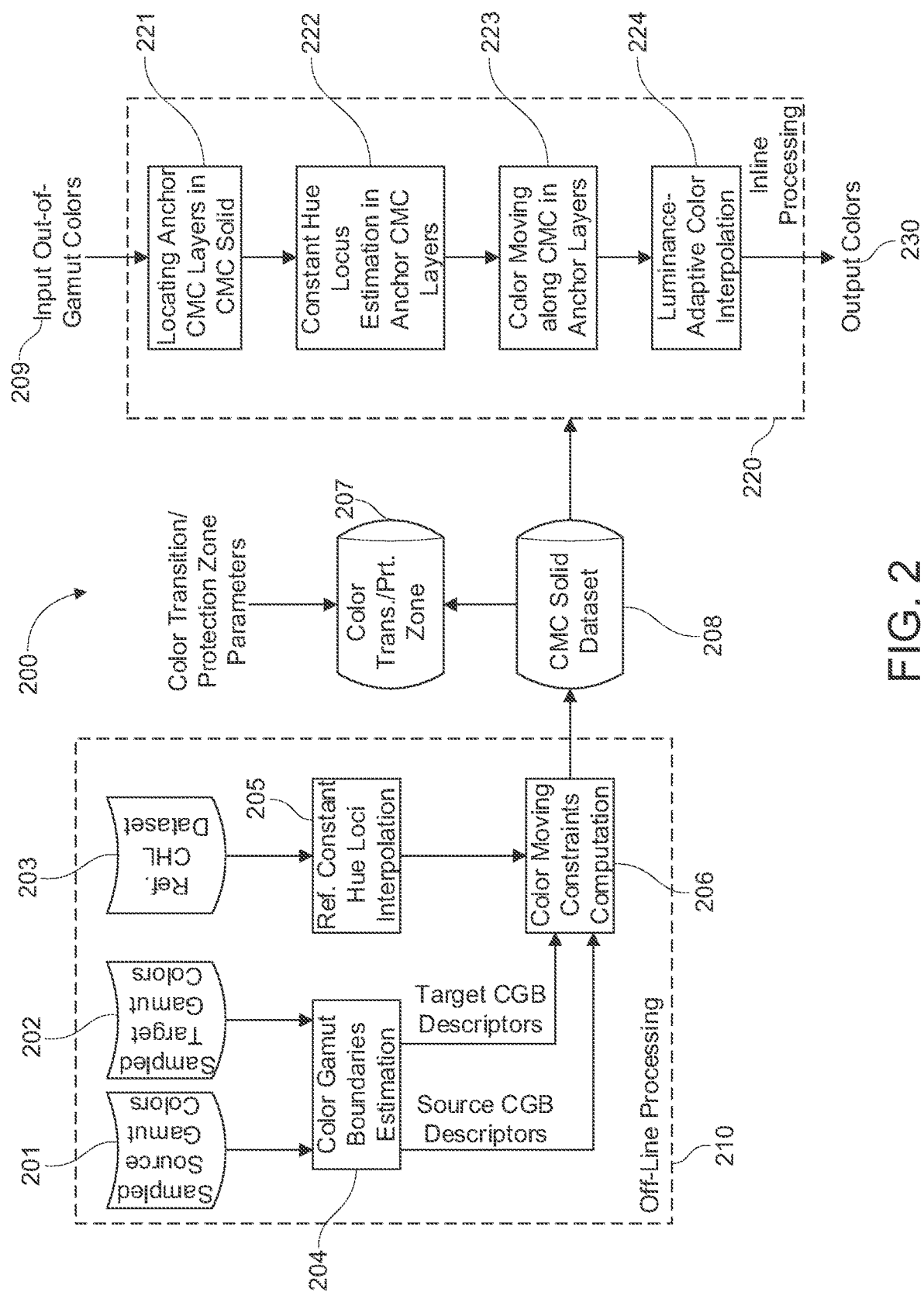
FIG. 2 shows an example high-level block diagram of a system, according to some embodiments.

FIG. 2 shows a high-level block diagram of a system 200, according to some embodiments. In one embodiment, the off-line processing portion 210 may be performed by one or more servers or cloud-based servers. In some embodiments, one or more on-device (e.g., smart phones, tablets, smart consumer products, etc.) processors may be implemented in the in-line processing portion 220 (e.g., an integrated circuit (IC), hardware circuitry, a multi-core processor, an application specific IC (ASIC), CPU, hybrid device and application programming interface (API), etc.).

In some embodiments, the off-line processing portion 210 includes sampled source gamut colors 201, sampled target gamut colors 202, perceptually consistent hue loci dataset 203, color gamut boundaries estimation processing 204, reference CHL interpolation processing 205 and CMC computation processing 206. Output from the color moving constraints computation 206 are stored in a CMC solid dataset datastore 208 and color transition/protection zone parameters are stored in a color transition/protection zone datastore 207. In some embodiments, the in-line processing portion 220 receives input from: OOG colors 209, the color transition/protection zone parameters datastore 207 and from the CMC solid dataset datastore 208. It should be noted that the in-line processing portion 220 keeps the colors that are inside the color transition/protection zone unchanged in the CIE-1931 space (the luminance and the code values of the colors are changed after PHP CGT, but their coordinates in the CIE-1931 diagram remain the same). In some embodiments, the in-line processing portion 220 includes locating anchor CMC layers in CMC solid processing 221, constant hue locus estimation (or perceptual consistent hue loci (PCHL)) in anchor CMC layers processing 222, color moving along CMC in anchor layers processing 223 and luminance-adaptive color interpolation processing 224. The output from the in-line processing portion 220 comprises output colors 230.

In some embodiments, the display for the output colors 230 may be a physical device for presenting the image or multi-media presentations. For example, the display may be a screen, including a liquid crystal display (LCD) panel, a plasma screen, a projection screen, a heads-up-display (HUD), light emitting diode (LED), organic LED (OLED), quantum dot LED (QLED), etc. In other embodiments, the display may be projected on an object or reflection device.

In some embodiments, the input (e.g., video images) may be transmitted/received wirelessly or through a wired interface (e.g., the communication path 54, FIG. 1) and may include uncompressed/compressed video content. In some embodiments, wireline or wireless communication of video imaging content in system 200 may include communication on/over one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1× enhanced voice-data only (EV-DO) or 1×EV-DO Gold Multicast) system, an IEEE 802.11x system, a DMB (Digital Multimedia Broadcasting) system, an orthogonal frequency division multiple access (OFDM) system, a DVB-H (Digital Video Broadcasting-Handheld) system, etc.

In some embodiments, the input to system 200 may be transmitted over a wireless network (e.g., Internet, local area network (LAN, wide-area network (WAN), personal area network (PAN), campus wireless network (CAN), metropolitan area network (MAN), etc., e.g., the communication path 54, FIG. 1). The input source may arise from a cloud-based system, a server, a broadcast station, a video device/player, a video camera, a mobile device, etc.

In some embodiments, compressed video image content from an input source may provide analog or digital video from a broadcast, computer network, a DVD or other computer readable storage medium, or any other suitable source of video signals. In one embodiment, the compressed video from an input source may be coupled to a receiver via a radio frequency interface (such as ATSC broadcasts), a computer network, or a wired or wireless connection such as a component video cable, a DVI or HDMI video interface, etc. In one embodiment, an uncompressed video image from an input source may include one or more of a video camera, or a memory device such as a disk drive coupled to a receiver by any suitable video interface. The uncompressed video from an input source may provide uncompressed video in analog or digital form including in the form of luminance and chrominance, in individual color intensities such as red, green and blue, etc., or in any other suitable format.

In some embodiments, digital video formats for input video content from an input source may include different frame rates, different numbers of lines and rows of pixels, interlaced and non-interlaced, etc. For example, movies are typically produced at 24 fps (frames per second) format, NTSC is 30 frames per second and PAL is 25 frames per second. The format may be interlaced or progressive. For example, high definition formats (such as supported by digital video broadcast standards) may be modified to a format that fits the format of a display device of an output source. The display device of an output source may be configured to receive NTSC, PAL, ATSC, DVB/T, etc.), or display device running at frame rates, such as 70 Hz, 75 Hz, 80 Hz, etc.

Carrying out CGM in the CIE-xyY space has benefits in both of the computational simplicity and the costs. But its perceptual non-uniformness properties limit its applications. The most serious problem of this strategy are: 1) hue distortions caused by the non-uniformness of the CIE-xyY space, and 2) high visual impacts generated by directly clipping OOG color (OOGC) to the gamut boundaries. Some embodiments solve the problems by introducing two important elements into the CIE-xyY space, namely, 1) a color transition/protection (CTP) zone $\Omega_T$, denoted $\Omega_Z$, for preserving the details and natural variations in OOGC; and 2) a set of strict color fidelity constraints to avoid serious hue distortions during color moving.

In some embodiments, the key to move OOGCs in the CIE-xyY space without introducing serious hue distortions is to find the colors' consistent hue loci (CHL), along each of which all colors have perceptually similar hues. The CHL form the color fidelity constraints for moving colors in the CIE-xyY space, i.e., the CMC processed by the CMC computation processing 206.

In some embodiments, the off-line processing portion 210 defines the gamut boundary descriptors (GBD) of both of $\Omega_S$ and $\Omega_T$ from the color gamut boundaries estimation processing 204, and the CMC between $\Omega_S$ and $\Omega_T$ determined by the CMC computation processing 206. The obtained GBD and the CMC are then saved into a hardware friendly lookup table (LUT) 810 (FIGS. 8 and 14) for later in-line processing 220 usages. In some embodiments, the off-line processing 210 only needs to carry out processing a single time. In some embodiments, the off-line processing 210 is not necessary to be hardware friendly.

In some embodiments, the in-line processing 220 adopts the GBD and the CMC obtained in the off-line processing 210, and carries out CGM in the perceptually non-uniform CIE-xyY space. A color transition/protection (CTP) zone $\Omega_Z$ is firstly defined from the received ST.2094-40 metadata (stored in the CTP zone parameters datastore 207. With $\Omega_Z$, the colors that are outside $\Omega_Z$ are defined as the OOGC. Note that $\Omega_Z$ does not need to be updated frequently and can be defined only once or is updated when contents statistics have significant changes (e.g., changes can be determined to be significant based on a ramp function and/or a specified/predetermined threshold). Second, the input linear RGB colors are converted to the chromaticity coordinates of the CIE-xyY space with a simple conversion matrix by the locating anchor CMC layers in CMC solid processing 221. Next, the positions of the non-OOGC are kept as unchanged, and the CHL of the OOGC is estimated by the CHL estimation in anchor CMC layers processing 222. Then, the OOGC is moved along their CHL to the appropriate positions inside $\Omega_T$ but between the boundaries of $\Omega_T$ and $\Omega_Z$ by the color moving along CMC in anchor layers processing 223. By avoiding mapping the OOGC only to the gamut boundaries, the abundant variations of OOGC are effectively preserved, and with the CHL, perceivable hue distortions in color moving are avoided. Different from the off-line processing 210, the in-line processing 220 is implemented in consumer products. The off-line processing 210 and the inline-processing 220 are described further below.

In some embodiments, the off-line processing 210 in the CGM processing obtains a hardware friendly LUT 810 (FIGS. 8 and 14) that contains the necessary information for carrying out CGM in the perceptually non-uniform CIE-xyY space, including the GBD of $\Omega_S$ and $\Omega_T$, and the CMC. GBD are critical for accurate CGM. A universal Segment Maxima algorithm exists to compute the GBD for a given gamut. However, benefiting from the linear gamut boundaries in the CIE-xyY space, some embodiments simplify the algorithm to obtain the GBD of $\Omega_S$ and $\Omega_T$: to an arbitrary given hue, its most saturated color is found as the boundary point of the hue using the CGB estimation processing 204. Let $w(x_w, y_w)$ be the white point defined by the given illuminant condition, to a given color $c(x,y)$, the off-line processing 210 approximates the hue and the saturation of c, denoted $h_c$ and $\rho_c$, respectively, as:

$$\begin{cases} h_c = a\tan((y - y_w)/(x - x_w)) \\ \rho_c = \sqrt{(x - x_w)^2 + (y - y_w)^2} \end{cases} \quad \text{Eq. (1)}$$

Note that color gamut is a 3-dimensional (3D) solid in color space. Color $c(x,y)$ may represent many colors located in $(x,y)$ but with different luminance. Gamut boundary points are then obtained by, $$b(h, l) = \underset{\substack{\forall h, l \\ c \in C}}{\arg\max} \rho_c, \quad \text{Eq. (2)}$$

where l is a given luminance, and C is the set of all available colors of the gamut. Only few GBD can well define the gamut boundaries at a luminance layer 1. The optional dataset updating processing allows users to update the PHP CGT datasets obtained in the off-line processing 210 according to the concrete image contents they met. The optional dataset adaptively changes the geometric properties of PHP CGT plans, such as the areas and vertices, to achieve an optimized compromise between saturation preserving and details protection. The in-line processing 220 carries out color moving inside the non-uniform CIE-1931 space by the color moving along CMC in anchor layers 223. To a given OOGC, the in-line processing 220 firstly determines the CHL of the color from the CMC obtained in the off-line processing 210 using the CHL estimation in anchor CMC layers processing 222.

Figure 3:
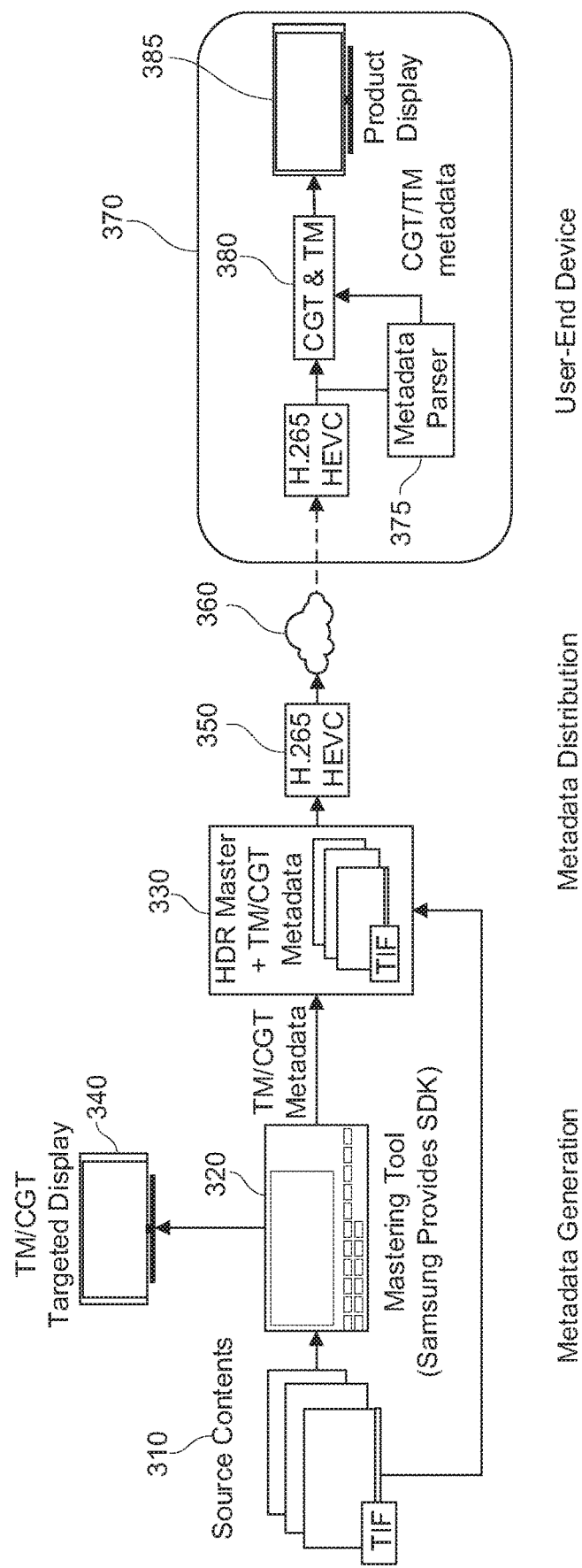
FIG. 3 shows a general workflow in broadcasting and high-dynamic range (HDR) contents distribution, according to some embodiments.

FIG. 3 shows a general workflow in broadcasting and HDR contents distribution, according to some embodiments. For metadata generation, source contents 310 (e.g., TV input framework (TIF)) is processed by a mastering tool 320 (e.g., SAMSUNG® SDK). The result from the mastering tool 320 includes tone mapping (TM)/CGT (TM.CGT) metadata that is input (along with TIF from the source content 310) to HDR master+TM/CGT metadata 330. The mastering tool 320 also provides an image to the TM/CGT targeted display 340. The output from the HDR master+TM/CGT metadata is input to high efficiency video coding (HEVC) H.265 350 that is stored in the cloud 360 for metadata distribution. The input to the user-end device 370 from the cloud 360 includes the HEVC H.265. The CGT/TM metadata is parsed from the metadata parser 375 and input to PHP CGT and TM processing 380, which then flows to the product display 385.

Figure 4:
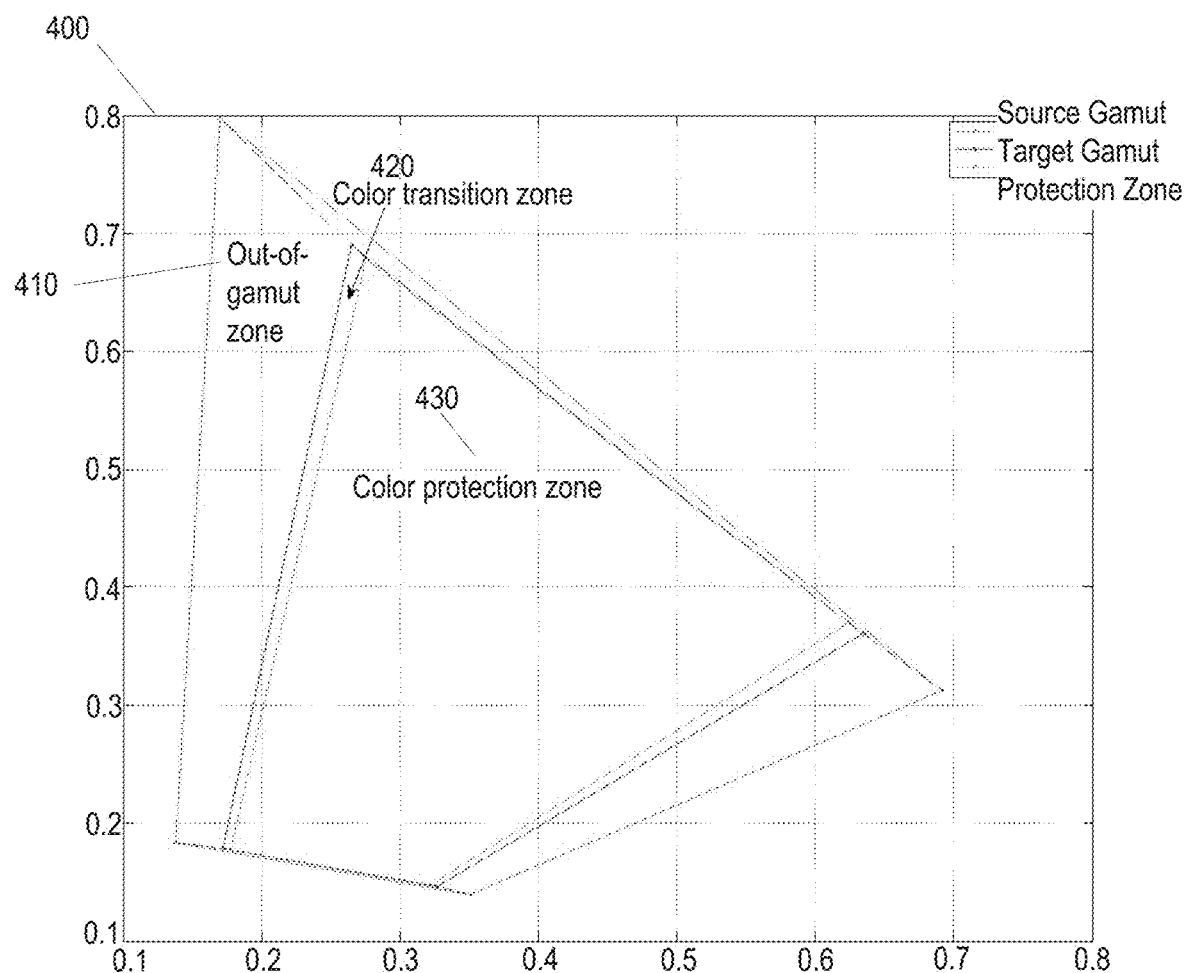
FIG. 4 shows an example graph showing an out-of-gamut zone, a color transition zone and a color protection zone used by some embodiments.

FIG. 4 shows an example graph 400 showing an OOG zone 410, a color transition zone 420 and a CP zone 430 used by some embodiments. A general rule of CGT techniques is to move an OOGC inside the target gamut without changing its luminance. In the CIE-1931 space, this is equivalent to move the OOGC located in the position (x,y,Y), where (x,y) is the chromaticity coordinates of the color, and Y is the luminance of the color, to a new position (x',y',Y) in the x-y plane at luminance layer Y. An important part of the off-line processing 210 (FIG. 2) is to determine the PHP CGT plans at different luminance layers. Different from most CGT techniques, whose CGT plans are only determined by the source and the target gamuts, the PHP CGT plans defined in the PHP CGT processing includes three parts, namely, 1) the OOG zone (see OOG zone 410), denoted $N_O(L_i)$, where $L_i$ is the i-th luminance layer in the CIE-1931 space, 2) the color transition zone (see color transition zone 420), denoted $N_T(L_i)$, and 3) the CP zone (see CP zone 430), denoted $N_P(L_i)$. Zone $N_P(L_i)$ is a region inside the target gamut at luminance layer $L_i$, and all the colors inside $N_P(L_i)$ are inside both of the source and target gamuts, thus they need not be moved in PHP CGT processing; $N_O(L_i)$ is the region between the boundaries of the source and the target gamuts at luminance layer $L_i$; and $N_T(L_i)$ is the region between the boundaries of the target gamut and $N_P(L_i)$. Example graph 400 shows an example of $N_O(L_i)$ (OOG zone 410), $N_T(L_i)$ (color transition zone 420), and $N_P(L_i)$ (CP zone 430). All the colors that are outside $N_P(L_i)$ are defined as OOGCs.

Figure 5A:
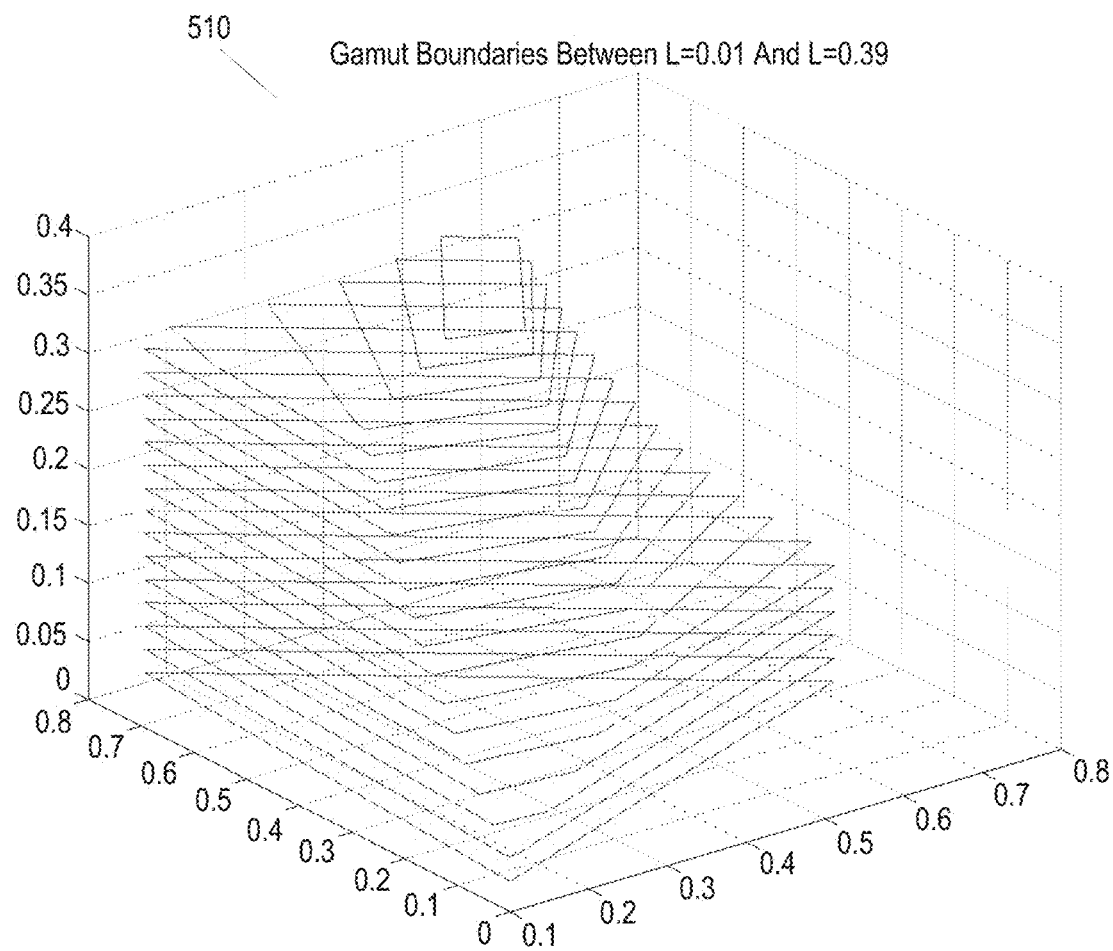
FIG. 5A shows a graph of example sampled gamut plans, according to some embodiments.
Figure 5B:
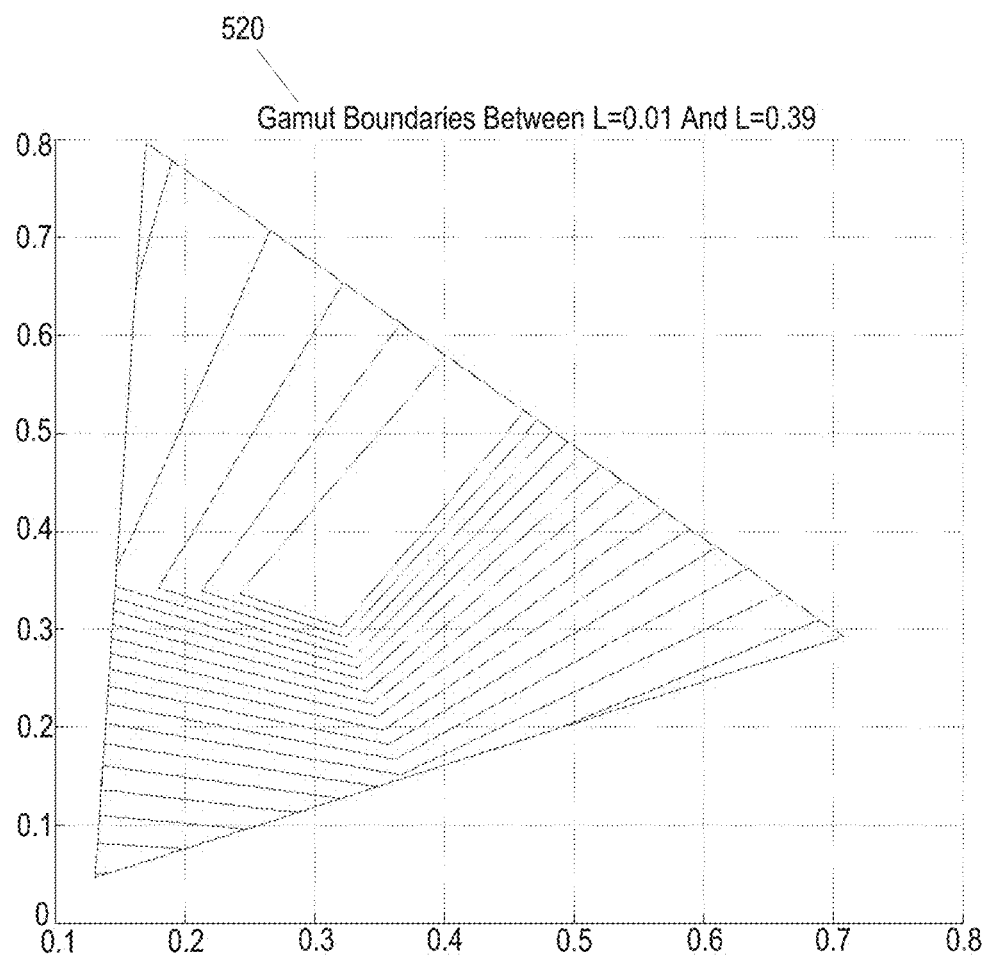
FIG. 5B shows a graph of example projection of the graph shown in FIG. 5A to the x-y plane, according to some embodiments.

FIG. 5A shows a graph 510 of example sample gamut plans, according to some embodiments. From the descriptions of a PHP CGT plan, $N_O(L_i)$ is essentially determined by the source and the target gamuts at luminance layer $L_i$, therefore, it cannot be changed once $\Omega_S$ and $\Omega_T$ are given. Similarly, the outer boundaries of $N_T(L_i)$ are determined by $\Omega_T$, and cannot be changed for a given $\Omega_T$. Its inner boundaries, which are also the boundaries of $N_P(L_i)$, determine both of $N_T(L_i)$ and $N_P(L_i)$. Therefore, a PHP CGT plan at layer $L_i$ is essentially determined by the definition of $N_P(L_i)$. But first, the computations of the source and the target gamut determined $N_O(L_i)$ are introduced. Zone $N_O(L_i)$ can be obtained from the color gamut boundaries (CGB) of $\Omega_S$ and $\Omega_T$ at layer Y=$L_i$ using CGB estimation processing 204 (FIG. 2). The CGB of a gamut at a given luminance layer is computed using CGB estimation processing 204 by fitting its sampled furthest color points to the reference white point. Given a direction θ, a gamut boundary point along θ in layer $L_i$ is computed as:

$$p(\theta, L_i) = \underset{\overline{pp_w} \in v(\theta)}{\mathrm{argmax}} \|pp_w\|, \ Y = L_i, \qquad \text{Eq. (3)}$$

where p is a color point that belongs to a gamut (either $\Omega_S$ or $\Omega_T$) at layer $L_i$, $p_w$ is the reference white point, and v(θ) is a small neighborhood of direction θ. With Eq. 3, the gamut boundary points of each luminance layer are computed by the CGB estimation processing 204. Then, least-square is applied to the sampled boundary points to form the boundaries of $N_O(L_i)$ or $N_T(L_i)$. Graph 510 shows the examples of the fitted CGB of gamut ITU-BT.2020 in different luminance layers. Similarly, the CGB of other gamut such as DCI-P3 can be obtained. FIG. 5B shows a graph 520 of an example projection of the graph shown in FIG. 5A to the x-y plane, according to some embodiments.

Figure 6:
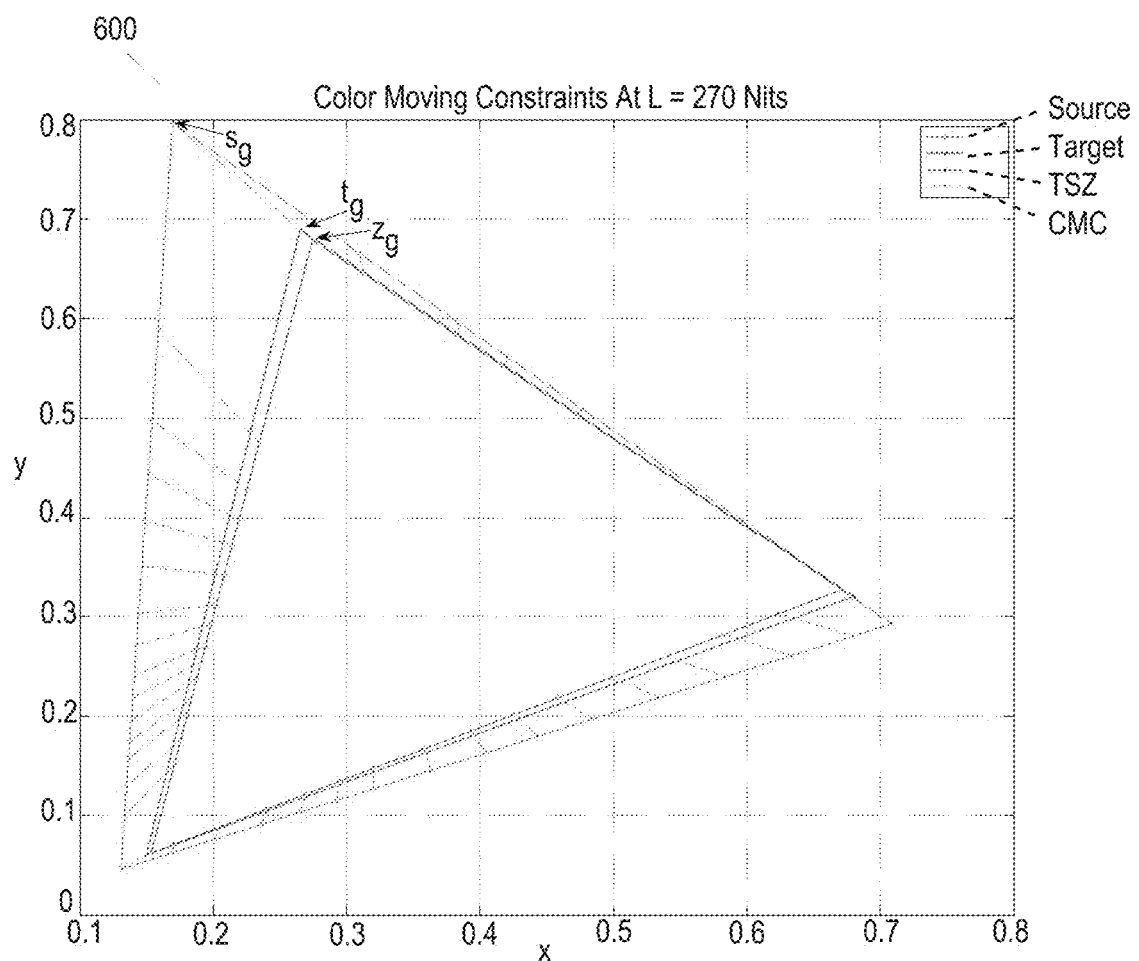
FIG. 6 shows an example graph of a path passing the green vertices of the PHP CGT plans, according to some embodiments.

FIG. 6 shows an example graph 600 of a path passing the green vertices of the PHP CGT plans, according to some embodiments. Zone $N_T(L_j)$ and $N_P(L_i)$ can be determined at the same time since $N_T(L_i)$ is the complement of $N_P(L_i)$ to $\Omega_T$ at layer $L_i$. Let $\overline{s_c t_c z_c}$ be a path that passes the corresponding vertices of $N_O(L_i)$, $N_T(L_i)$, and $N_P(L_i)$, where c may be g for the green, b for the blue, p for the purple, or r for the red vertex. From the definition of $N_P(L_i)$, $s_c$ and $t_c$ are determined by $\Omega_S$ and $\Omega_T$, and cannot be changed. Point $z_c$ in fact determines $N_P(L_i)$ as well as $N_T(L_i)$. Graph 600 shows an example of the path passing the green vertices. As can be seen in graph 600, the position of affects both of $N_T(L_i)$ and $N_P(L_i)$. When fixing the rest of the plan vertices, the longer $|\overline{t_g z_g}|$ is, the bigger the $N_T(L_i)$ is, and the smaller the $N_P(L_i)$ is. Since $\overline{s_g t_g}$ is fixed and determined by the given $\Omega_S$ and $\Omega_T$, it is convenient to adjust the position of with $\overline{s_g t_g}$ and a factor $\alpha_g$, as shown in Eq. (4), $$z_g : |\overline{t_g z_g}| = \alpha_g |\overline{s_g t_g}|. \qquad \text{Eq. (4)}$$

Similarly, other vertices of $N_P(L_i)$ can also be determined from corresponding segments $|\overline{s_r t_r}|$, and $|\overline{s_p t_p}|$, and the factors $\alpha_r$, $\alpha_b$, and $\alpha_p$ (if purple vertex is available), respectively.

One of the most important rules that is widely adopted in different CGT techniques is to keep the perceptual similarities of the OOGCs before and after CGT as much as possible. With this logic, the source colors that are inside $\Omega_T$ should keep their original coordinates in CIE-xyY space unchanged. However, the rule may lead to serious loss of details in OOGCs and high visual impacts in the converted contents. By keeping the colors that are inside $\Omega_T$ unchanged, all OOGCs will be mapped to the boundaries of $\Omega_T$. Color variations of OOGCs may be lost since multiple OOGCs may be mapped to a single color on one of the gamut boundaries. Color continuity may also be broken, and high visual impacts such as bandings, spots, etc., may occur in the converted contents. Therefore, in a high performance CGT in the CIE-1931 space, color moving should 1) effectively protect the details in the OOGCs, and 2) maintain the color continuity of the original colors in the converted colors.

In some embodiments, the CMC computation 206 (FIG. 2) adopts an adaptive PHP CGT strategy using the PHP CGT plans described above: the colors inside $N_P(L_i)$ will not be moved thus preserve their original hue and saturation as they are in the source gamut, and the colors outside $N_P(L_i)$, including both of $N_O(L_i)$ and $N_T(L_i)$, will be gradually moved inside $N_T(L_i)$. Specifically, the colors in an outer boundary of $N_O(L_i)$ will be moved to the corresponding outer boundary of $N_T(L_i)$; the colors in an outer boundary of $N_P(L_i)$ will not be moved; and the rest colors between the two boundaries will be gradually moved to the positions between the outer boundaries of $N_T(L_i)$ and $N_P(L_i)$ depending on their positions in $N_O(L_i)$. In some embodiments, variations in the OOGCs can be at least partly preserved in the corresponding colors in $N_T(L_i)$, and the color continuity is maintained.

The CIE-1931 space is non-uniform. A small color offset may lead to large perceptual color difference. Without effective constraints, moving colors in a non-uniform space is risky of huge hue distortions. In some embodiments, the CMC computation 206 introduces a set of effective CMC that maintain the hue consistency in color moving in the non-uniform CIE-1931 space.

The most important idea to perceptual hue-distortion free CGT is that if an OOGC is moved along its perceptually CHL, no visible hue distortion will be introduced into the converted colors. The reference CHL, which is designed based on rigorous measurements of human subjects' visual responses to colors, and defines its colors in the perceptually uniform dimensions of the hue, the value, and the chroma, is a good reference for finding the CHL for arbitrary colors. With the reference CHL, which represents the sampled colors in CIE-1931 space, the CHL in specific luminance layers are obtained using the reference CHL interpolation processing 205. With inner-layer and inter-layer interpolation, the reference CHL interpolation processing 205 computes the CHL of arbitrary colors from the reference CHL sets.

Figure 7:
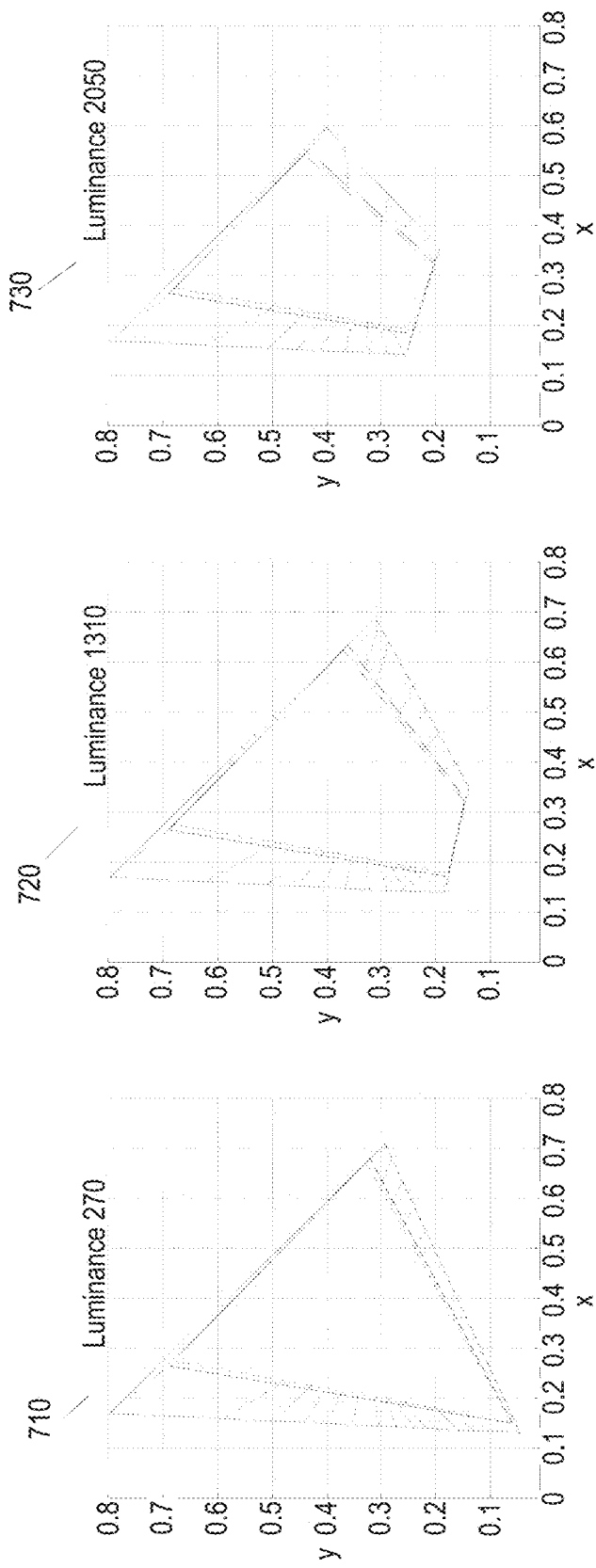
FIG. 7A shows an example graph of color moving constraints (CMC) in a first luminance layer, according to some embodiments.
FIG. 7B shows an example graph of CMC in a second luminance layer, according to some embodiments.
FIG. 7C shows an example graph of CMC in a third luminance layer, according to some embodiments.

FIG. 7A shows an example graph 710 of CMC in a first luminance layer, FIG. 7B shows an example graph 720 of CMC in a second luminance layer, and FIG. 7C shows an example graph 730 of CMC in a third luminance layer, according to some embodiments. The colors inside $N_P(L_i)$ will not be moved in PHP CGT. Also, the colors that are outside $N_O(L_i)$ make no sense to PHP CGT processing since they will not exist in the source contents. Therefore, it is not necessary to take the complete reference CHL as the reference in color moving by the CMC computation processing 206. Considering the fact that color moving only happens between the outer boundaries of $N_O(L_i)$ and $N_P(L_i)$, only the CHL segments between the two boundaries make sense to restrict color moving. This greatly decreases the complexity of the CMC computation processing 206. Another important issue is that the reference CHL are nonlinear curves, and moving colors along nonlinear curves needs more complicated computations. In some embodiments, the CHL segments between the outer boundaries of $N_O(L_i)$ and $N_P(L_i)$ are linearized without introducing great hue distortions in the final outputs by the CMC computation processing 206: (1) the length of a CHL segment between $N_O(L_i)$ and $N_P(L_i)$ is relatively small, and its curvature is also relatively small. In such a case, linearizing a small part of the locus will not lead to serious fitting errors; and (2) human vision system (HVS) has different sensitivities to different color tones. The MacAdam Ellipses show that HVS has big color difference tolerance (CDT) in green tones, and relatively small CDT in blue tones. From the PHP CGT plans obtained in the off-line processing 210 (FIG. 2), the CHL segments between $N_O(L_i)$ and $N_P(L_i)$ satisfy the MacAdam Ellipses. The green tone CHL segments are relatively long and linearization of those segments may lead to relatively big fitting errors. But the CDT of HVS is big with respect to green tones, thus no high visual impact will be generated. Similarly, the CDT of HVS in blue tones is small, but the CHL segments of blue tones are also short, thus have relatively small fitting errors. High visual impacts can be also avoided in blue tones. Similar to the CHL segments of the red tones. Linearizing the Munsell CHL segments in the CMC computation processing 206 further decreases the complexity of the PHP CGT and the size of necessary datasets.

In some embodiments, with the linearized CHL segments, a CMC path in luminance layer $L_i$ can be simply defined as the line segment between the intersection of a reference CHL and its corresponding boundary of $N_O(L_i)$, denoted $s(j, L_i)$, where j is the index of the CHL in layer $L_i$, and the intersection of the locus and the corresponding boundary of $N_P(L_i)$, denoted $z(j, L_i)$. Correspondingly, the intersection of the locus and the boundary of $N_T(L_i)$ is also determined, denoted $t(j, L_i)$. Note that to a given layer, $s(j, L_i)$, $t(j, L_i)$ and $z(j, L_i)$ can be simply referred to $s_j$, $t_j$, and $z_j$, and the CMC paths of layer $L_i$ are:

$$P(L_i) = \{\overline{s_j t_j z_j}\}_{j=0,1,\ldots,M'}$$    Eq. (5)

where M is the total number of the CHL in layer $L_i$. FIGS. 7A-C show the examples of the CMC in different luminance layers.

In some embodiments, two kinds of datasets are necessary: 1) the boundary information of $N_O(L_i)$, $N_T(L_i)$, and $N_P(L_i)$ from the CGB estimation processing 204 (FIG. 2); and 2) the CMC paths of different luminance layers from the CMC computation processing 206. In some embodiments, the two datasets just need to be computed once, and saved into the LUT 810 (FIGS. 8 and 14) for future PHP CGT processing in the in-line processing 220. For decreasing the costs of products but still keeping the accuracy of the converted colors, the LUT 810 should pack as much as possible CMC without using a huge amount of system resources. Using the data redundancy between the two datasets, some embodiments adopt a cross-layer CMC referencing strategy that packs up to 10 CMC layers into a very small LUT 810.

In some embodiments, it should be noted that the boundary information of $N_O(L_i)$, $N_T(L_i)$, and $N_P(L_i)$ are redundant data of the CMC paths. For example, the green-blue outer boundary of $N_O(L_i)$ is the line determined by the end points {s} of the CMC paths passing the green and the blue vertices; the blue-red boundary of $N_S(L_i)$ is the line determined by the end points {s} of the CMC paths passing the blue and the red vertices, etc. Similarly, the boundaries of $N_T(L_i)$ are determined by points {t} of the corresponding CMC paths passing the vertices of $N_T(L_i)$ (see the examples in FIG. 6). Therefore, by recording the index of the CMC paths that pass the PHP CGT plan vertices, the boundary information of both $N_O(L_i)$ and $N_T(L_i)$ can be fully recovered from the CMC paths. In graph 600 and FIGS. 7A-C there are five (5) PHP CGT plan vertices, including the green, the blue, the purple, the red, and the cross-gamut vertex. Note that not all the vertices exist in each PHP CGT plan: 1) the gamut plans having low luminance only have the green, the blue, and the red vertices (i.e., the primaries); 2) in addition to the three primaries, the PHP CGT plans having high luminance also have the purple vertex; and 3) the cross-gamut vertex is gamut- and luminance-dependent. For example, in ITU-BT.2020 to DCI-P3 CGT, the red vertex of DCI-P3 gamut is outside the ITU-BT.2020 gamut at low-luminance layers. Thus, the red-green boundary of the ITU-BT.2020 gamut and the one of the DCI-P3 gamut has an intersection, i.e., the cross-gamut vertex. As luminance increases, the red vertex of DCI-P3 moves inside the ITU-BT.2020 gamut, and the cross-gamut vertex does not exist.

Additionally, for different applications in practice, some embodiments adaptively save different numbers of CMC into the LUT 810 (FIGS. 8 and 14). In the software applications, or high-end display products having high system resources, some embodiments save a high number of CMC into the LUT 810. Thus, the most accurate colors of the target gamut can be obtained. To the applications having limited system resources, for example, market-available HDR TV products, some embodiments adopt a high-efficiency cross-layer referencing strategy that takes advantage of the CMC data redundancy between neighboring luminance neighbors to save more CMC but greatly reduce the size of LUT 810.

It should be noted that there is large data redundancy that exists between neighboring layers. First, the green primaries of most $N_O(L_i)$ and $N_T(L_i)$ are the same except the layers having extremely high luminance. Second, the corresponding CMC are very similar or equal to each other in the low-luminance layers. As the luminance increases, only the CMC paths between the blue-purple and the purple-red boundaries have relatively large changes, until the luminance becomes too high. The rest of the CMC paths still retain their similarities, some embodiments save two complete CMC sets of low-luminance layers, and only the CMC paths that have significant changes in high luminance layers. In CGT processing, an incomplete CMC layer at a given luminance layer can be recovered by referencing its missed CMC paths from a completely saved CMC layer. Thus, some embodiments do not need additional system resources for CMC uncompressing.

Figure 15:
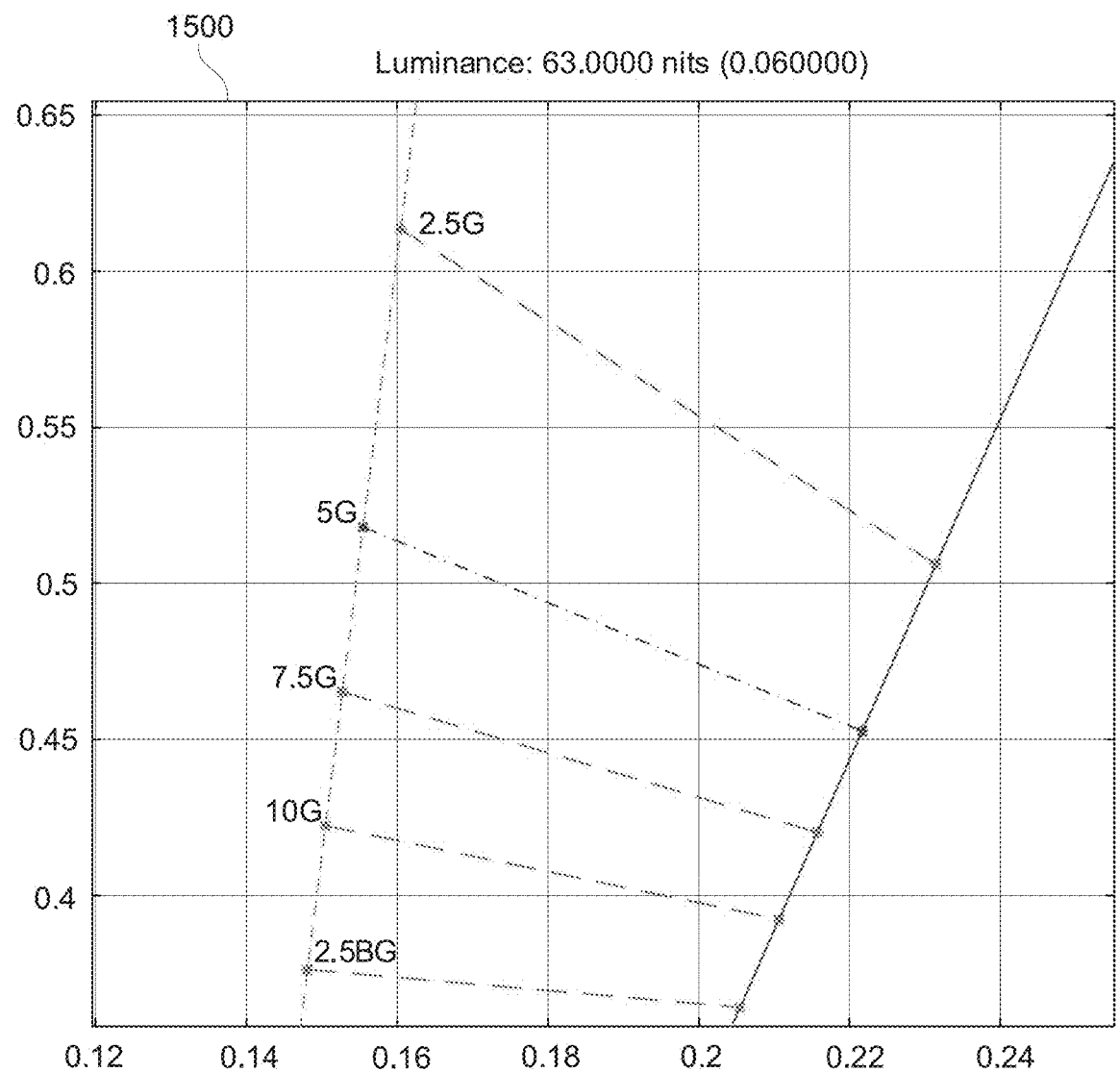
FIG. 15 shows an example graph showing how a CMC can be represented by its neighbors for removing redundant CMC, according to some embodiments.

In some embodiments, ten (10) CMC layers are selected to be saved into the LUT 810 (FIGS. 8 and 14), including: a primary layer, which has relatively low luminance, and contains the complete CMC; a base layer, which has relatively high luminance, and also contains the complete CMC paths. Parts of its CMC paths have high data redundancy to other layers, and thus can be re-used for rebuilding CMC sets of other layers; and eight rebuilt layers, which have very high luminance. Each of the layers only contains small number of CMC paths which have significant changes in different layers. In CGT processing, the missed CMC paths are from the base layer. Since the CMC paths between the blue, the purple, and the red vertices change the most as luminance changes, a rebuilt layer only saves those CMC. To conveniently access the CMC paths from the base layer, each rebuilt layer records an index before which the CMC paths will be referenced from the base layer. The index is thus defined as the cut-off index. Additionally, since the green primary points in most gamut plans are the same, the index of the CMC path passing the green primary is a constant, and need not be saved in the LUT 810. In a rebuilt layer, the CMC paths before the blue-vertex path are all from the base layer, so the blue-vertex path is the first CMC path, and its index is 0, and there is no need to save it in the LUT 810. Since the value of the index of the CMC paths are all small (less than 42), especially in the rebuilt layers, the values are generally less than 12, such that 4 to 6 bits are enough to save the index, which further decreases the size of the LUT 810. FIG. 15 shows an example graph 1500 showing how a CMC can be represented by its neighbors for removing redundant CMC, according to some embodiments.

In some embodiments, locating the redundant CMC involves a CMC that can be represented by its neighbors, which is considered as a redundant CMC. In some embodiments, the redundant CMC may be removed from the CMC list. Averagely, approximately 40% to 45% of CMCs are redundant, depending on the luminance layers. Removing redundant CMC significantly decreases processing and memory usage.

In some embodiments, although PHP CGT processing can directly obtain the CMC by taking the CHL segments between $\Omega_S$ and $\Omega_T$, the segments are non-linear. This is not convenient to either the color moving operator or CMC storage in the LUT 810 (FIGS. 8 and 14). The CHL segments between $\Omega_S$ and $\Omega_T$ can be linearized without greatly affect the final visual quality. This greatly decreases the LUT 810 size, and simplifies the color moving computations. In some embodiments, the linearized CHL segments are defined as the CMC. In color moving, a general rule is that the vertex colors of $\Omega_S$ should also be moved to the corresponding vertices of $\Omega_T$.

For some embodiments, Table 1 lists the structures of the CMC LUT 810. In a hardware implementation, the LUT 810 a table contains 160 points that define the CMC paths in 10 different layers, 30 important CMC index values, and 10 luminance values. In one example, the LUT size is 1.92K bytes.

TABLE 1

| | |
|---|---|
| The Primary Layer | Luminance |
| | Index of the blue-vertex CMC path |
| | Index of the red-vertex CMC path |
| | Index of the cross-gamut vertex CMC path |
| | 42 CMC paths |
| The Base Layer | Luminance |
| | Index of the blue-vertex CMC path |
| | Index of the purple-vertex CMC path |
| | Index of the red-vertex CMC path |
| | 30 CMC paths |
| The Rebuilt Layer (Repeat 8 times) | Luminance |
| | Index of the cut-off CMC path in the base layer |
| | Index of the purple-vertex CMC path |
| | Index of the red-vertex CMC path |
| | 11 CMC paths |

FIG. 8 shows a high-level flow 800 for PHP CGT processing in the in-line processing 220 portion, according to some embodiments. One important strategy of some embodiments is to move an OOGC along its CHL inside the target gamut. Since the colors in a CHL have perceptually the same hue, the converted color will not have perceptible hue distortions or high visual impacts. The CHL of an OOGC can be estimated by the CHL estimation processing 830 and 840 from the obtained CMC obtained from the off-line processing 210 (FIG. 2). However, due to the limits of processing and memory costs, not all of the CMC luminance layers are saved in the CMC LUT 810. Some embodiments adopt a cross-layer interpolation strategy to carry out PHP CGT processing in arbitrary luminance layers.

In some embodiments, to an OOGC c(x,y,Y) 801, two reference CMC layers that are the closest to Y in the CMC LUT 810 at luminance layers $Y_1$ and $Y_2$ are firstly located by the reference layers locating processing 820, and $Y_1 \leq Y \leq Y_2$. The CHL of c in each of the reference layers is then estimated from the layer's CMC by the CHL estimation processing 830 and 840. Then, c is moved along its CHL in each of the reference layers until it is inside the $N_T$ of the layer via the inside-gamut color computation processing 850 and 860. Two reference colors in the $N_T$ of the two reference layers are thus obtained. The final output color 880 is computed by interpolating the two reference colors according to the luminance Y of the input color c by the luminance-adaptive color interpretation processing 870. With the cross-layer luminance adaptive color interpolation strategy, the PHP CGT is applied to arbitrary colors with different luminance.

In some embodiments, the PHP CGT processing in the high-level flow 800 needs to determine if an input color is an OOGC 801, i.e., tests if the color is outside $N_P(L_i)$. In some embodiments, only the OOGCs will be moved. A $N_P(L_i)$ includes the line segments between its vertices. For example, the $N_P$ in graph 600 (FIG. 6) includes three segments, namely $\overline{z_g z_b}$, $\overline{z_b z_r}$, and $\overline{z_r z_g}$. To a given color position (x,y), PHP CGT processing can detect if (x,y) is inside the $N_P$ by simply testing if the point is always in the left side of each zone boundary (note: $\{z_*\}$ are organized counterclockwise). If (x,y) is always in the left side of the boundaries, the point is inside $N_P(L_i)$. A general detection of the relationship between a line and a point is described as follows.

Let $\overline{p_1(x_1,y_1)p_2(x_2,y_2)}$ be a line with the ends $(x_1,y_1)$ and $(x_2,y_2)$, respectively, the point (x,y) that satisfies (4) is in the left side of the line.

$$(y_2-y_1)(x-x_1)+(x_1-x_2)(y-y_1) \leq 0. \quad \text{Eq. (6)}$$

With Eq. (6), PHP CGT processing can conveniently detect whether a color is inside $N_P(L_i)$.

In some embodiments, the flow 800 performs PHP CGT processing in the PHP CGT plans of different luminance layers. The PHP CGT plans are obtained by Eq. (4). In some embodiments, an optional strategy is that users can manually set the PHP CGT plan adaptation factors $\alpha_r$, $\alpha_g$, $\alpha_p$, and $\alpha_b$, thus $N_T(L_i)$ and $N_P(L_i)$ can be set adaptively to concrete scene contents. Although $\alpha_g$, $\alpha_r$, $\alpha_b$, and $\alpha_p$ can be any values in [0, 1], users should follow some important rules when setting the parameters in practice for high-quality output colors. The rules include the following: 1) the value of $\alpha_*$ should not be too big. Since the Munsell CHL are nonlinear, and the CMC paths computed from them are the linearized loci segments, too big of a factor may lead to a too-long CMC path and high linearization errors. This may generate perceptible hue distortions; 2) the values of $\alpha_*$ also should not be too small except that all input colors are in fact inside $N_T(L_i)$ (in such a case, the source gamut is used as a container of the target gamut colors). Too small of $\alpha_*$ will lead to big-size $N_P(L_i)$ thus $N_T(L_i)$ is too small to effectively protect color variations in out-of-gamut colors; and 3) from MacAdam Ellipses, the HVS has a relatively big color difference tolerance in green tones but a small tolerance in blue tones. Therefore, users can set relatively big values to $\alpha_g$, but should avoid big values of $\alpha_b$. Especially, since the boundaries of $N_O(L_i)$ and $N_T(L_i)$ near the blue-purple vertices are very close to each other, few variations exist in the colors locating in the region. Even very small $\alpha_b$ will not lead to clipping artifacts.

In some embodiments, the CHL of a given color is estimated from the CMC saved in the LUT 810. Specifically, the CHL of the color is estimated in CHL estimation processing 830 and 840 from the neighboring CMC paths between which that the color is located in. The two CMC paths as well as the corresponding boundary of $N_P(L_i)$ form a hue sector. To an arbitrary OOGC c 801, if the hue sector (where c is located) is found, its CHL can be estimated from the edges of the hue sector, and eventually, the corresponding inside-gamut color of c can be determined along the CHL by inside-gamut color computation processing 850 and 860.

In some embodiments, determining if an input color (x,y) 801 is located in a hue sector is similar to the case of determining if the color is inside $N_P(L_i)$. With Eq. (6), if an OOGC point is in the left side of both of the edges of a hue sector (the end points of the hue sector are arranged counterclockwise), the point is inside the hue sector.

In some embodiments, once the hue sector of an input OOGC is located, the CHL of the color can be estimated using CHL estimation 830 and 840 from the hue sector edges. The basic idea of the CHL estimation processing 830 and 840 is to find a path that satisfies the following conditions: 1) the path passes the input OOGC point; and 2) the path should be equal to an existing CMC path if the given color is located on the CMC path. When the input color is inside a hue sector including two neighboring existing CMC paths, its direction vector should gradually/proportionally change between the direction vectors of the hue sector edges.

Figure 9:
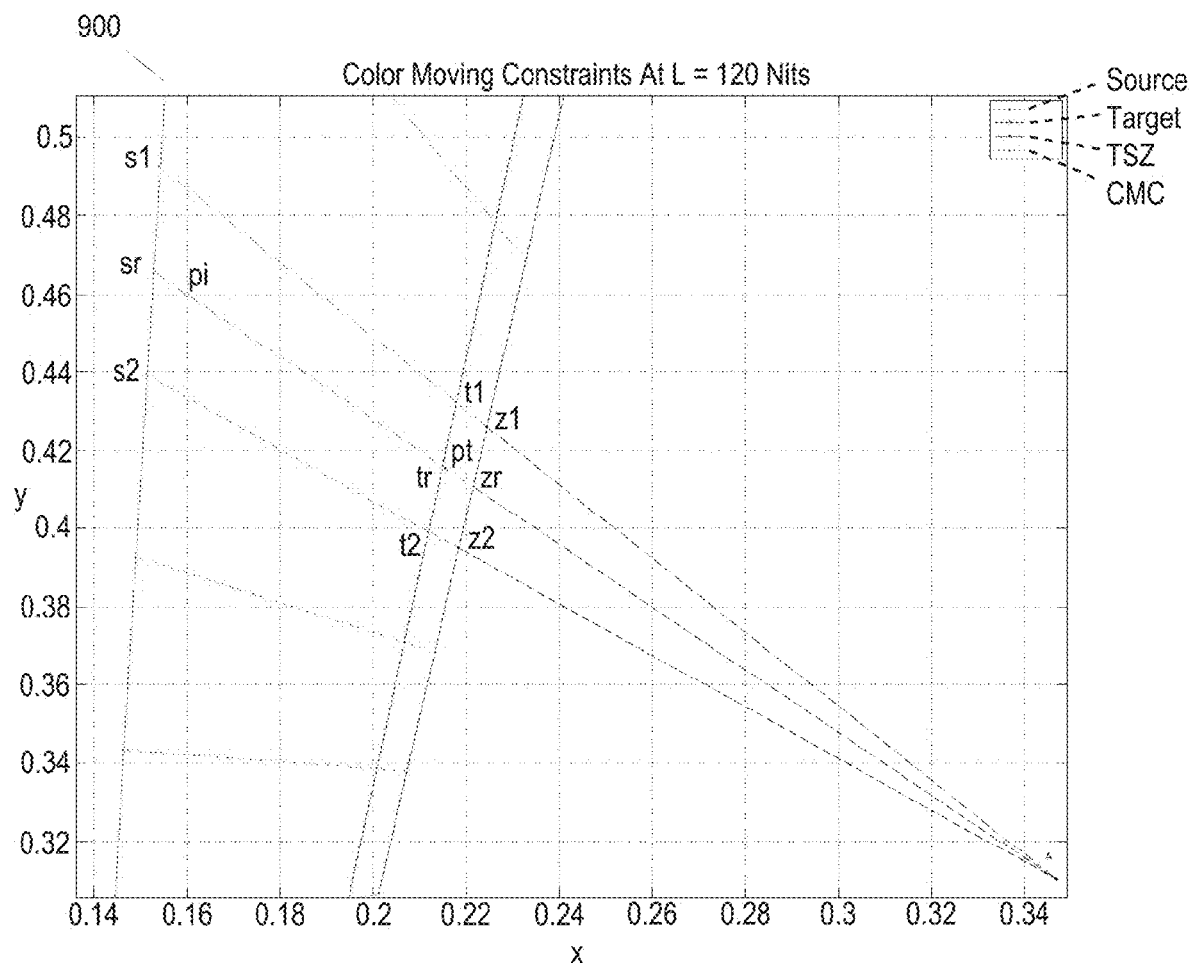
FIG. 9 shows an example graph showing geometric consistent hue locus interpolation, according to some embodiments.

FIG. 9 shows an example graph 900 showing geometric CHL interpolation, according to some embodiments. Graph 900 shows the anchor point based CHL estimation that satisfies the conditions mentioned above. In some embodiments, to a given color $p_i(x,y)$ located in the hue sector including two neighboring edges $\overline{s_1 t_1 z_1}$ and $\overline{s_2 t_2 z_2}$, respectively, the intersection of $\overline{s_1 z_1}$ and $\overline{s_2 z_2}$ is computed as the anchor point of the hue sector, denoted A. The path determined by $p_i$ and A, i.e., $\overline{p_i A}$, and the corresponding boundaries of $N_O(L_i)$, $N_T(L_i)$, and $N_P(L_i)$, determines three reference points, denoted $s_r$, $t_r$, and $z_r$, respectively, as shown in graph 900. The line segment $\overline{s_r t_r z_r}$ is the estimated CHL of $p_i$. As can be seen from graph 900, $\overline{s_r t_r z_r}$ satisfies the three conditions listed above.

In some embodiments, for the color moving along CMC in anchor layers processing 223, once the CHL of $p_i$ is obtained, the output inside-gamut color $p_t$ of $p_i$ can be located by finding the color point that maintains the relative position of $p_i$ in its CHL $\overline{s_r t_r z_r}$ using inside-gamut color computation processing 850 and 860. In $N_O(L_i)$, the relative position of $p_i$ on its CHL $\overline{s_r z_r}$ is computed as:

$$r_p = \frac{|\overline{p_i z_r}|}{|\overline{s_r z_r}|}. \quad \text{Eq. (7)}$$

In $N_T(L_i)$, the CHL of the output color to be determined, i.e., $p_t$, is $\overline{t_r z_r}$. PHP CGT processing locates $p_t$ by finding the point that satisfies:

$$\frac{|\overline{p_t z_r}|}{|\overline{t_r z_r}|} = r_p. \quad \text{Eq. (8)}$$

Let $(x_t, y_t)$ and $(x_z, y_z)$ be the coordinates of $t_r$ and $Z_r$, respectively, and $(x_o, y_o)$ be the coordinates of $p_t$, (6) can be rewritten as:

$$\begin{cases} x_o = x_z + r_p(x_z - x_t) \\ y_o = y_z + r_p(y_z - y_t) \end{cases}. \quad \text{Eq. (9)}$$

The corresponding inside-gamut color of the given color $p_i$ is thus obtained.

In some embodiments, to a given OOGC, each of its reference colors in its reference luminance layers are computed independently as described above. To obtain the final output in its own layer, some embodiments adopt a cross-layer luminance adaptive color interpolation strategy to interpolate the obtained reference colors according to the luminance of the input color using luminance-adaptive color interpolation processing 870. To a given color $p_i$ located at (x,y,Y) in CIE-1931 space, some embodiments find its corresponding inside-gamut colors in each of its reference layers at $L_i$ and $L_{i+1}$, as described above. Let $p_t^1$ and $p_t^2$ be the corresponding inside-gamut points located in $(x_1,y_1,Y_1)$ and $(x_2,y_2,Y_2)$ in layers $L_i$ and $L_{i+1}$ respectively, the final output $p_t$ can be interpolated from $p_t^1$ and $p_t^2$ as $$\begin{cases} x = x_1 + \beta(x_2 - x_1) \\ y = y_1 + \beta(y_2 - y_1) \end{cases}, \quad \text{Eq. (10)}$$

where $\beta$ is the ratio factor determined by the location of Y in line $\overline{Y_1 Y_2}$, namely, $$\beta = \frac{Y - Y_1}{Y_2 - Y_1}. \quad \text{Eq. (11)}$$

To evaluate the robustness of some embodiments to different color contents, all test images in the LUMA HDRV HDR content database are tested (over 14,000 images). In order to be brief, some comparison examples are randomly selected to demonstrate the performance. Also, for convenience of performance evaluations, and considering the real-world use cases in the HDR and WCG broadcasting/distribution industries, the ITU-BT.2020 and the DCI-P3 gamuts are taken as the source and the target gamuts respectively in the evaluations.

Figures 10A, 10B, 10C:
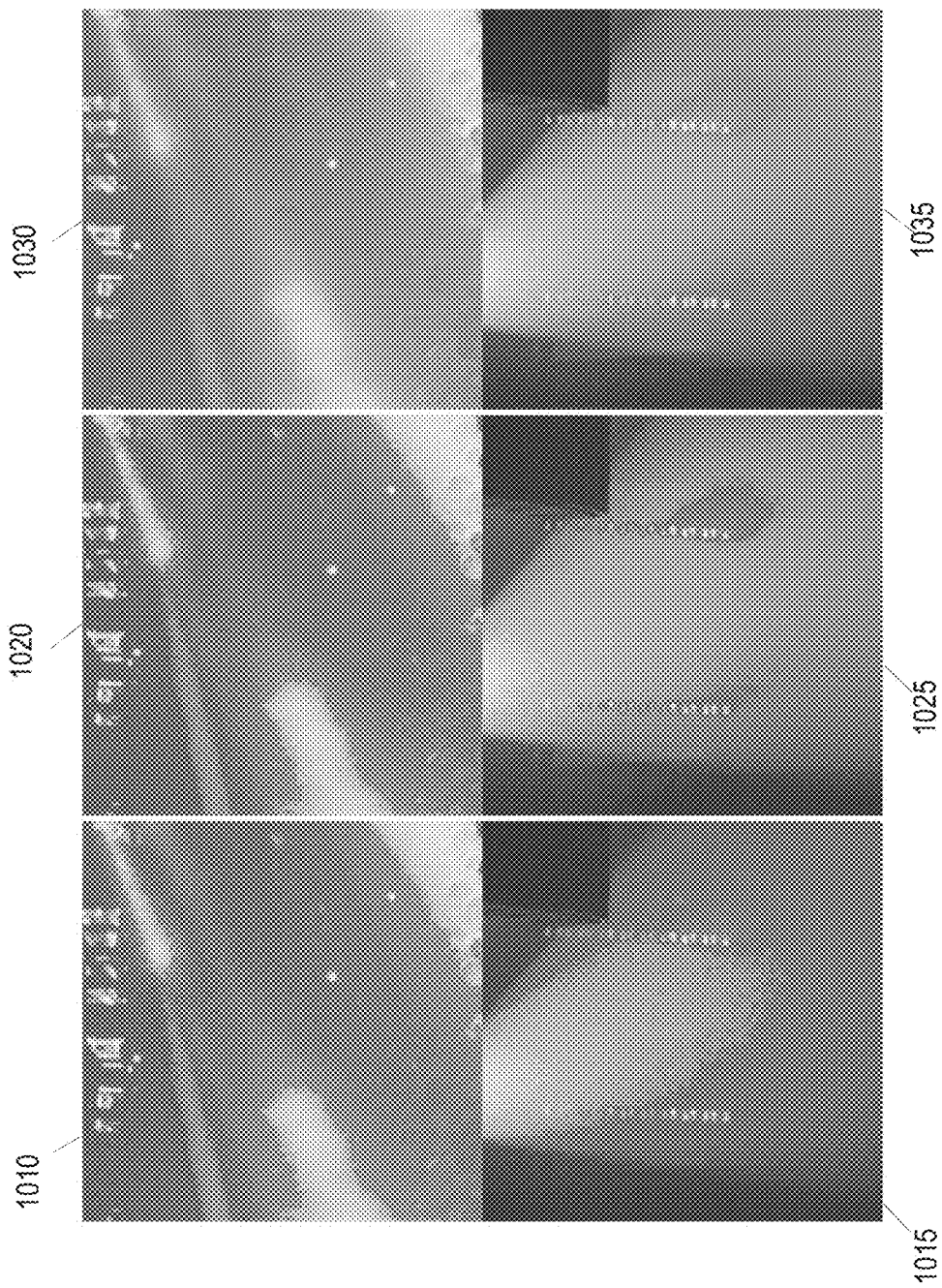
FIG. 10A shows example images of color-space conversion (CSC)-based CGT with gradual changed cyan-blue and green tones.
FIG. 10B shows example images of color gamut mapping (CGM)-based CGT with gradual changed cyan-blue and green tones.
FIG. 10C shows example images of PHP CGT in non-uniform CIE-1931 color space with gradual changed cyan-blue and green tones, according to some embodiments.

FIG. 10A shows example images 1010 and 1015 of color-space conversion (CSC)-based CGT with gradual changed cyan-blue and green tones. Using the famous LUMA HDRV HDR content database, which is with the ITU-BT.2020 gamut, and widely used in evaluating the performance of HDR and WCG algorithms, the performance of some embodiments are compared with conventional techniques. As for the reference CGT processing, the color-space conversion (CSC) based CGT (for example images 1010 and 1015), and the CIE-1931 space based CGM (for example images 1020 and 1025) methods are used. The two strategies are widely used in commercial applications due to their simplicity and low-costs. The CSC based CGT converts an out-of-gamut color to a boundary color of the target gamut using a CSC matrix followed by color clipping. It is the most efficient and cheapest CGT in conventional practice. The CGM method moves OOGCs to the nearest target gamut boundary along certain paths. It is also efficient and economic. The same CMC is adopted as some embodiments use it as the color moving paths in CGM for fair comparisons. The CAM based CGT is not used as the reference since they are generally expensive, and seldom used in TV products.

As can be seen in FIGS. 10A-B, the CSC-based (example images 1010 and 1015) and the CGM based CGT (example images 1020 and 1025) perform similar to each other. Both of their results contain serious clipping artifacts. This is because the two conventional methods move all OOGCs to a gamut boundary. Multiple OOGCs may become few colors in the target gamut, and variations in the source colors are lost. As shown in FIG. 10C, example images 1030 and 1035 result from some embodiments that generate the most visually pleasing colors. It effectively preserves the variations in the OOGCs, thus the gradually changed colors in the source gamut still have similar variations in the target gamut. Although its resulting colors do not look as saturated as the ones obtained by the CSC-based CGT (FIG. 10A), the CSC-based CGT obtained colors that are over-saturated, and visually unnatural in TV displays.

Figures 11A, 11B, 11C:
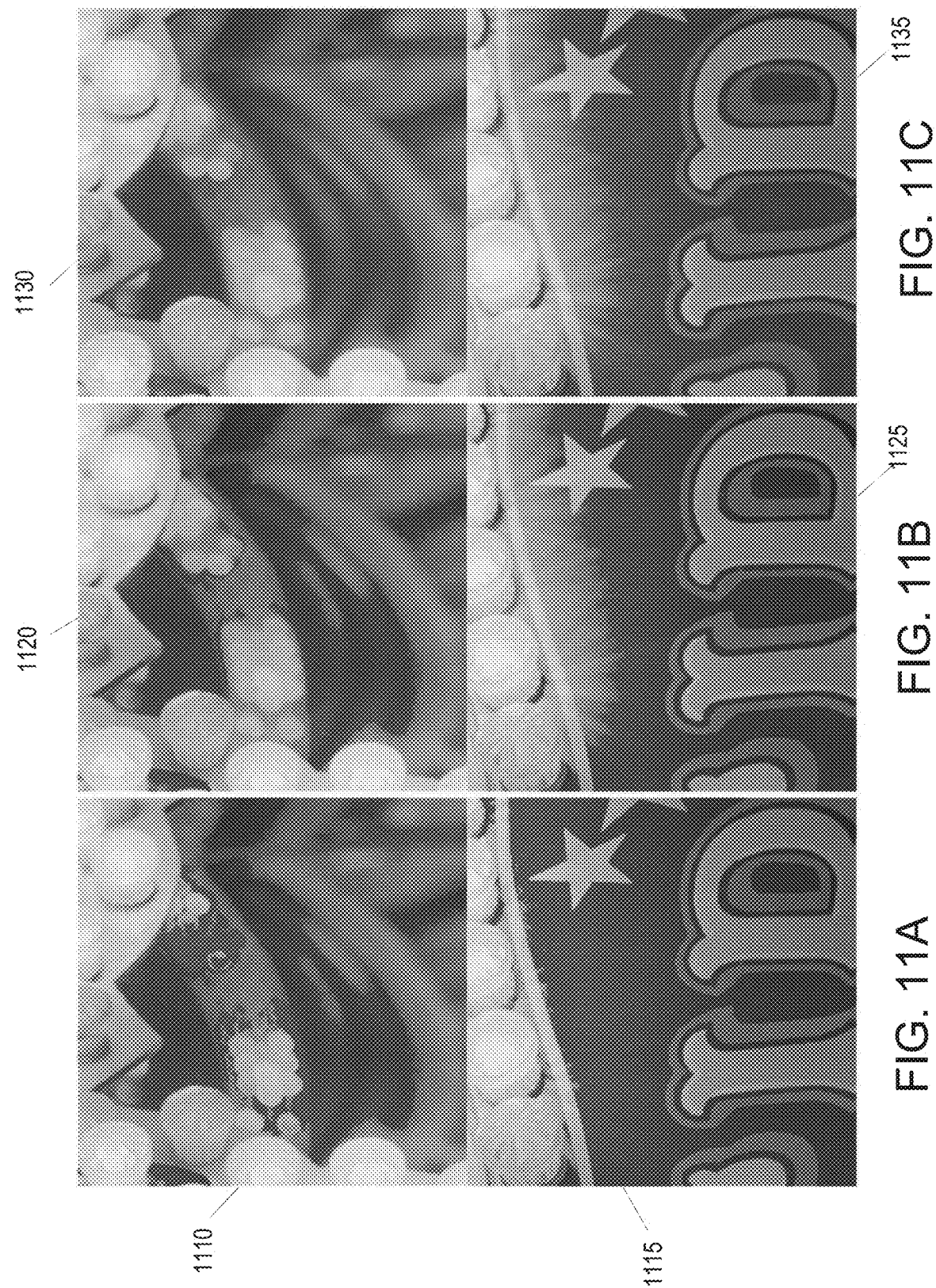
FIG. 11A shows example images of CSC-based CGT with delicate details in out of gamut (OOG) colors.
FIG. 11B shows example images of CGM-based CGT with delicate details in OOG colors.
FIG. 11C shows example images of PHP CGT in non-uniform CIE-1931 color space with delicate details in OOG colors, according to some embodiments.

FIG. 11A shows example images 1110 and 1115 of CSC-based CGT with delicate details in OOGCs. The CSC-based CGT example images 1110 and 1115 show seriously over-saturated output colors, and all delicate details in OOGCs are lost. High visual impacts thus occur. FIG. 11B shows example images 1120 and 1125 of CGM-based CGT with delicate details in OOGCs. The CGM method outperforms the CSC-based method, but it seriously loses the details of OOGCs. FIG. 11C shows example images 1130 and 1135 of PHP CGT in non-uniform CIE-1931 color space with delicate details in OOGCs, according to some embodiments. As can be seen, the PHP CGT processing of the embodiments performs the best. It effectively protects the delicate details and maintains the continuity in OOGCs and obtains natural and visually pleased inside-gamut colors. Further, comparing the results of CSC- or CGM-based CGT, the results of one or more embodiments are less saturated. On one hand, this may decrease the colorfulness of the obtained colors. On the other hand, this effectively protects the details and color continuity in OOGCs. In practice, an optimized compromise between saturation protection and detail and color continuity should be achieved.

Figure 12C:
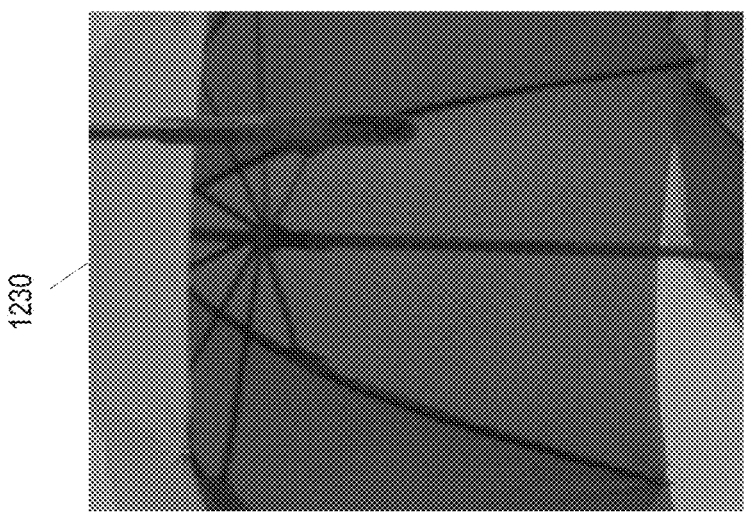
FIG. 12C shows an example image of PHP CGT in non-uniform CIE-1931 color space for color continuity preserving properties, according to some embodiments.
Figure 12B:
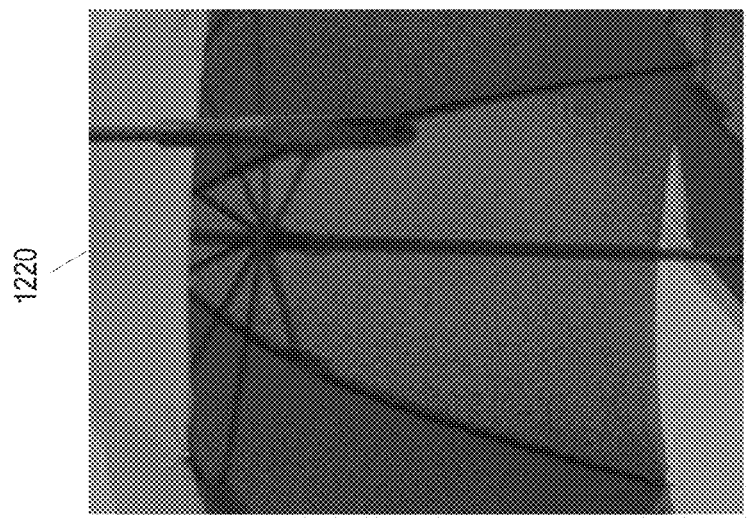
FIG. 12B shows an example image of CGM-based CGT for color continuity preserving properties.
Figure 12A:
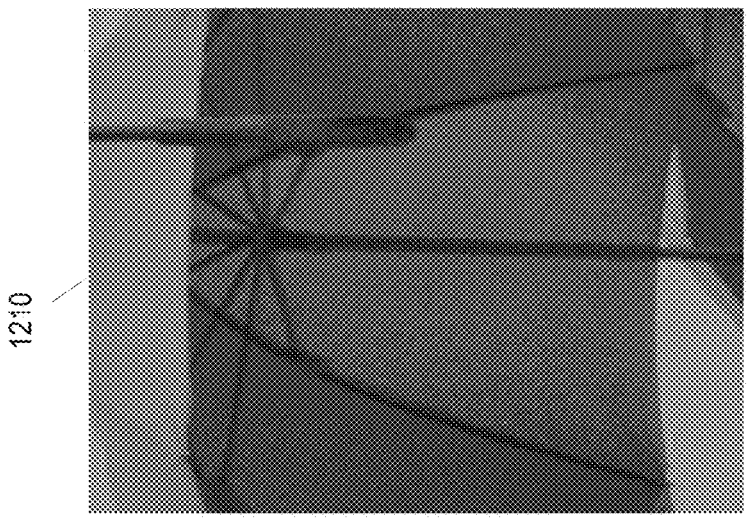
FIG. 12A shows an example image of CSC-based CGT for color continuity preserving properties.

FIG. 12A shows an example image 1210 of CSC-based CGT for color continuity preserving properties. FIG. 12B shows an example image 1220 of CGM-based CGT for color continuity preserving properties. FIG. 12C shows an example image 1230 of PHP CGT in non-uniform CIE-1931 color space for color continuity preserving properties, according to some embodiments. As shown in FIGS. 12A-B the colors of the umbrellas, which are continuous in the original ITU-BT.2020 contents, become discontinuous in the colors obtained by the CSC-based (image 1210) and CGM-based (image 1220) methods. Clipping and spot artifacts seriously decrease their output visual quality. However, the colors are visually more colorful than the colors obtained by one or more embodiments (image 1230). The colors obtained by one or more embodiments successfully maintain their continuity, and do not introduce any high visual impacts into the output colors. However, it slightly less saturates the output colors.

Figure 13C:
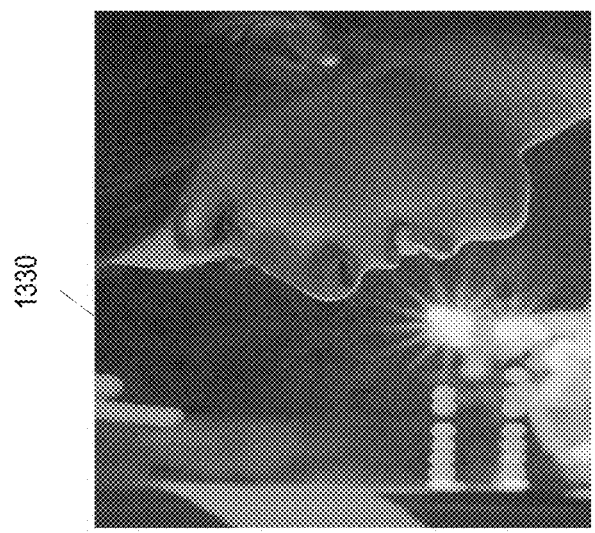
FIG. 13C shows an example image of PHP CGT in non-uniform CIE-1931 color space for robustness to multiple image contents, according to some embodiments.
Figure 13B:
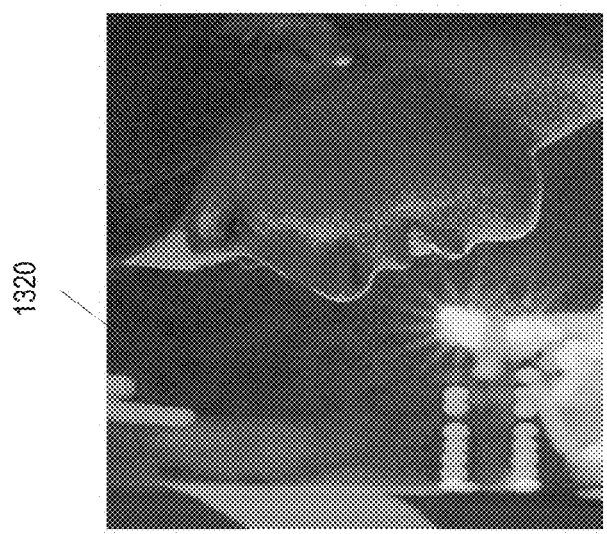
FIG. 13B shows an example image of CGM-based CGT for robustness to multiple image contents.
Figure 13A:
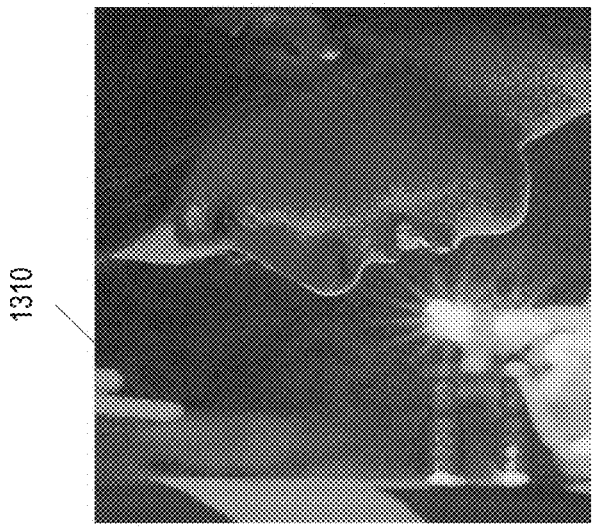
FIG. 13A shows an example image of CSC-based CGT for robustness to multiple image contents.

FIG. 13A shows an example image 1310 of CSC-based CGT for robustness to multiple image contents. FIG. 13B shows an example image 1320 of CGM-based CGT for robustness to multiple image contents. FIG. 13C shows an example image 1330 of PHP CGT in non-uniform CIE-1931 color space for robustness to multiple image contents, according to some embodiments. The input ITU-BT.2020 shown in the images 1310, 1320 and 1330 contents contain both very high brightness (the light bulbs) and continuously changed colors (the face of the girl). As can be seen from image 1310, the CSC-based CGT seriously over-saturates the output colors. Without effective CMC, it generates serious hue distortions and high visual impacts. The CGM-based method shown in image 1320 performs better than the CSC-based method since it effectively avoids the over-saturated artifacts in the bright light bulbs regions. However, since it maps OOGCs to the gamut boundaries, thus it breaks the continuity of the colors in the target gamut, as shown in the high visual impacts in the girl's face in image 1320. One or more embodiments perform very stable to the contents as shown in image 1330. With the CMC, one or more embodiments successfully preserve the perceptual hues of bright contents, and at the same time, the color continuity in the target gamut. No high visual impact is found in the results of one or more embodiments as seen in image 1330.

FIG. 14 shows a block diagram of an example hardware implementation layout, according to some embodiments. In some embodiments, input to the off-line processing 1410 include CIE-1931 colors 1401 and CMC definitions 1402. The off-line processing 1410 includes color quantization 1411, hue sector locating 1412, anchor point computations 1413, anchor index recording 1414 and LUT 810. The in-line processing 1420 obtains input from the LUT 810 and OOGC. In some embodiments, in-line processing 1420 includes locating quantized neighboring colors 1421, determine anchor processing 1422, compute CHL processing 1423 and move color along CHL processing 1424, which results in output 1430. The components of the in-line processing 1420 is hardware, such as integrated circuits (ICs), updatable firmware, processors, etc. The off-line processing 1410 hardware may be disposed in one or more servers. The in-line processing 1420 hardware may be disposed in a consumer device, such as a TV device, a display device, etc.

Figure 16:
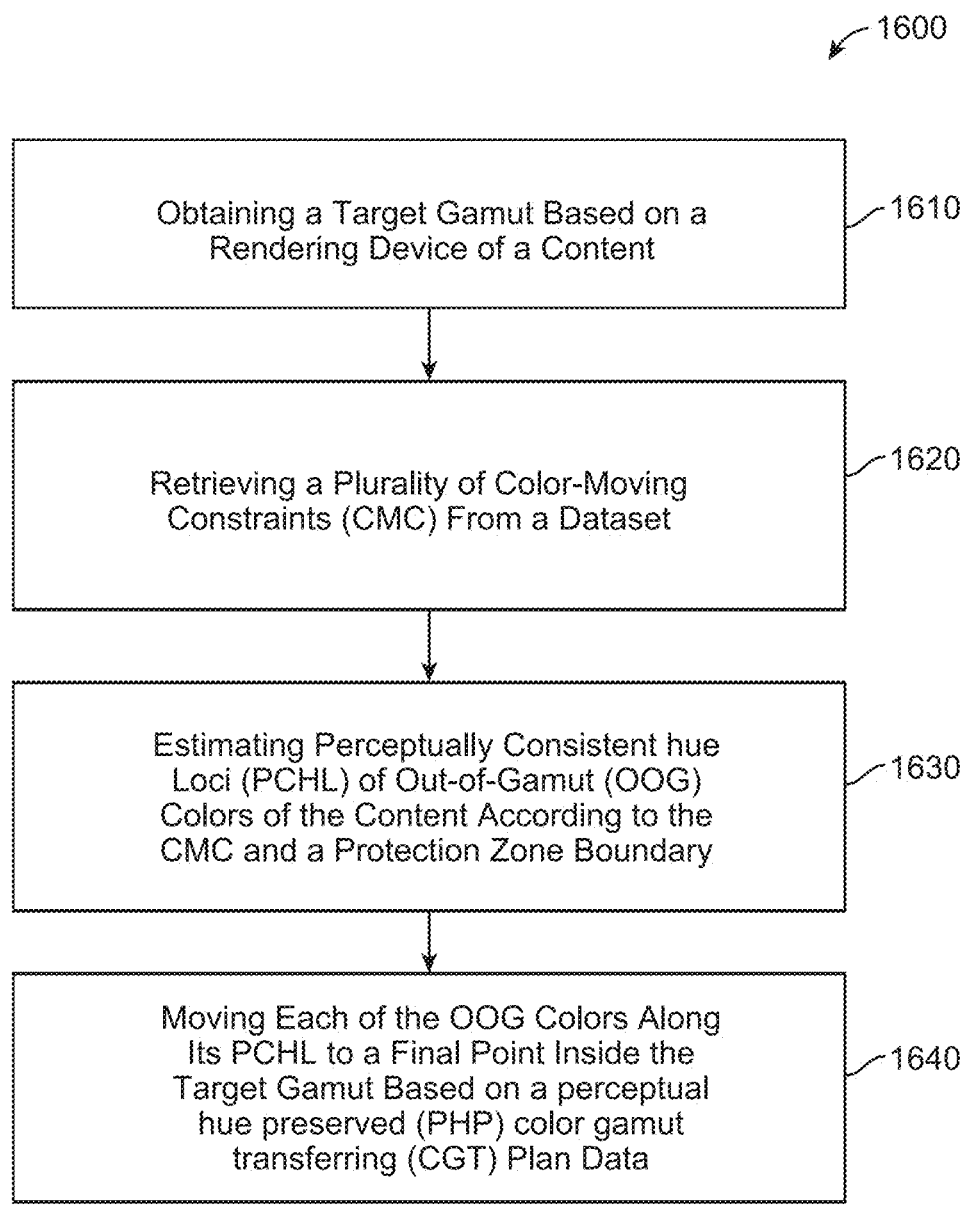
FIG. 16 shows a block diagram for PHP CGT in non-uniform CIE-1931 color space processing, according to some embodiments.

FIG. 16 shows a block diagram of a process 1600 for PHP CGT in non-uniform CIE-1931 color space processing, according to some embodiments. In some embodiments, in block 1610 the process 1600 includes obtaining a target gamut (e.g., target gamut colors 202, FIG. 2) based on a rendering device (e.g., a server performing off-line processing 210, FIG. 2, a mastering tool 320, FIG. 3, off-line processing 1410, FIG. 14, etc.) of a content (e.g., input to off-line processing 210, FIG. 2, source contents 310, FIG. 3, etc.). In block 1620, process 1600 retrieves (e.g., by in-line processing 220, FIG. 2) multiple CMC from a dataset (e.g., CMC solid dataset datastore 208). In block 1630, process 1600 estimates PCHL (e.g., constant hue locus estimation in anchor CMC layers processing 222, FIG. 2, CHL estimation processing 830 and 840, FIG. 8, etc.) of OOGCs (e.g., OOGCs 209) of the content according to the CMC and a protection zone boundary (e.g., from the color transition/protection zone datastore 207). In block 1640, process 1600 moves each of the OOGCs along its PCHL to a final point inside the target gamut based on a PHP CGT plan data (e.g., from color moving along CMC in anchor layers processing 223, move color along CHL processing 1424, FIG. 14, etc.). In some embodiments, the PHP CGT plan data includes target and source boundary information formed using the CMC and the protection zone boundary.

In some embodiments, in process 1600 metadata (e.g., TM/CGT metadata from HDR master+TM/CGT metadata 330, FIG. 3) associated with the content includes the protection zone boundary and source gamut. For each luminance level, a CMC connects intersections formed by PCHL with the target gamut boundary and source gamut boundary (e.g., via CHL estimation in anchor CMC layers processing 223, CHL estimation processing 830 and 840, etc.).

In some embodiments, process 1600 further includes selecting neighboring luminance layers from the CMC (e.g., via reference layers locating processing 820, FIG. 8). A luminance layer of the OOGC is between the neighboring luminance layers.

In some embodiments, process 1600 further includes in each of the neighboring luminance layers, moving the OOGC along its PCHL to an anchor point inside a corresponding target gamut (e.g., via color moving along CMC in anchor layers processing 223, FIG. 2, luminance-adaptive color interpolation processing 870, FIG. 8, move color along CHL processing 1424, FIG. 14, etc.).

In some embodiments, process 1600 further includes obtaining the final point inside the target gamut by color interpolation between anchor points (e.g., via luminance-adaptive color interpolation processing 870, FIG. 8). In some embodiments, PCHL is determined using a Munsell Renotation dataset (e.g., CHL reference dataset 203, FIG. 2).

In some embodiments, process 1600 further includes updating the CMC according to perceptual requirement by changing geometric properties of the PHP CGT plan data (e.g., updating the PHP CGT datasets obtained in the off-line processing 210 (FIG. 2) or 1410 (FIG. 14) within the LUT 810, FIGS. 8 and 14).

Figure 17:
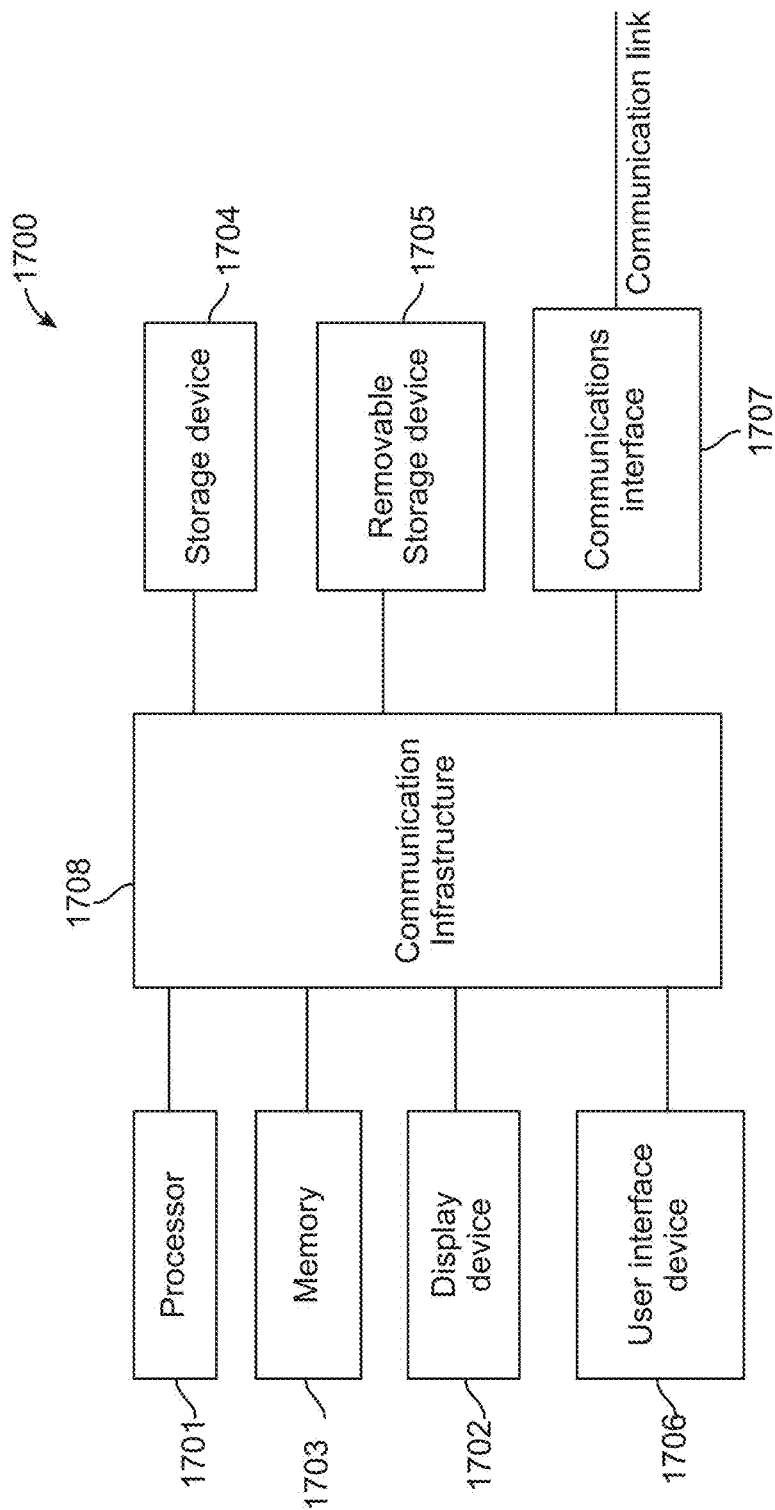
FIG. 17 is an exemplary high-level block diagram showing an information processing system comprising a computer system useful for implementing disclosed embodiments.

FIG. 17 is a high-level block diagram showing an information processing system comprising a computer system 1700 useful for implementing the disclosed embodiments. Computer system 1700 may be incorporated in a device 52, 56, FIG. 1, etc.). The computer system 1700 includes one or more processors 1701, and can further include an electronic display device 1702 (for displaying video, graphics, text, and other data), a main memory 1703 (e.g., random access memory (RAM)), storage device 1704 (e.g., hard disk drive), removable storage device 1705 (e.g., removable storage drive, removable memory module, a magnetic tape drive, optical disk drive, computer readable medium having stored therein computer software and/or data), user interface device 1706 (e.g., keyboard, touch screen, keypad, pointing device), and a communication interface 1707 (e.g., modem, a network interface (such as an Ethernet card), a communications port, or a PCMCIA slot and card). The communication interface 1707 allows software and data to be transferred between the computer system and external devices (e.g., over communication path 54, FIG. 1). The system 1700 further includes a communications infrastructure 1708 (e.g., a communications bus, cross-over bar, or network) to which the aforementioned devices/modules 1701 through 1707 are connected.

Information transferred via communications interface 1707 may be in the form of signals such as electronic, electromagnetic, optical, or other signals capable of being received by communications interface 1707, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

In some embodiments, processing instructions for PHP CGT processing may be stored as program instructions on the memory 1703, storage device 1704 and the removable storage device 1705 for execution by the processor 1701.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C.

section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A perceptual hue preserved (PHP) color gamut transferring (CGT) method carried out in CIE-1931 color space, comprising:
   obtaining a target gamut based on a rendering device of a content;
   retrieving a plurality of color-moving constraints (CMC) from a dataset;
   estimating perceptually consistent hue loci (PCHL) of out-of-gamut (OOG) colors of the content according to the CMC and a protection zone boundary;
   moving each of the OOG colors along its PCHL to a final point inside the target gamut based on a PHP CGT plan data, wherein the PHP CGT plan data includes target and source boundary information formed using the CMC and the protection zone boundary; and
   displaying an output in the CIE-1931 color space that is based on the moving of each of the OOG colors.

2. The PHP CGT method of claim 1, wherein metadata associated with the content includes the protection zone boundary and source gamut.

3. The PHP CGT method of claim 2, wherein, for each luminance level, a CMC connects intersections formed by PCHL with the target gamut boundary and source gamut boundary.

4. The PHP CGT method of claim 3, further comprising:
   selecting neighboring luminance layers from the CMC, wherein a luminance layer of the OOG color is between the neighboring luminance layers.

5. The PHP CGT method of claim 4, further comprising:
   in each of the neighboring luminance layers, moving the OOG color along its PCHL to an anchor point inside a corresponding target gamut.

6. The PHP CGT method of claim 5, further comprising:
   obtaining the final point inside the target gamut by color interpolation between anchor points.

7. The PHP CGT method of claim 1, wherein PCHL is determined using a consistent hue loci (CHL) reference dataset.

8. The PHP CGT method of claim 7, further comprising:
   updating the CMC according to perceptual requirement by changing geometric properties of the PHP CGT plan data.

9. A non-transitory processor-readable medium that includes a program that when executed by a processor performs a perceptual hue preserved (PHP) color gamut transferring (CGT) method, carried out in CIE-1931 color space, comprising:
   obtaining a target gamut based on a rendering device of a content;
   retrieving a plurality of color-moving constraints (CMC) from a dataset;
   estimating perceptually consistent hue loci (PCHL) of out-of-gamut (OOG) colors of the content according to the CMC and a protection zone boundary;
   moving each of the OOG colors along its PCHL to a final point inside the target gamut based on a PHP CGT plan data, wherein the PHP CGT plan data includes target and source boundary information formed using the CMC and the protection zone boundary; and
   displaying an output in the CIE-1931 color space that is based on the moving of each of the OOG colors.

10. The non-transitory processor-readable medium of claim 9, wherein metadata associated with the content includes the protection zone boundary and source gamut.

11. The non-transitory processor-readable medium of claim 10, wherein, for each luminance level, a CMC connects intersections formed by PCHL with the target gamut boundary and source gamut boundary.

12. The non-transitory processor-readable medium of claim 11, wherein the method further comprises:
    selecting neighboring luminance layers from the CMC, wherein a luminance layer of the OOG color is between the neighboring luminance layers; and
    in each of the neighboring luminance layers, moving the OOG color along its PCHL to an anchor point inside a corresponding target gamut.

13. The non-transitory processor-readable medium of claim 12, wherein the method further comprises:
    obtaining the final point inside the target gamut by color interpolation between anchor points.

14. The non-transitory processor-readable medium of claim 9, wherein PCHL is determined using a consistent hue loci (CHL) reference dataset.

15. The non-transitory processor-readable medium of claim 14, wherein the method further comprises:
    updating the CMC according to perceptual requirement by changing geometric properties of the PHP CGT plan data.

16. An apparatus comprising:
    a memory storing instructions; and
    at least one processor executes the instructions including a process configured to:
       obtain a target gamut based on a rendering device of a content;
       retrieve a plurality of color-moving constraints (CMC) from a dataset;
       estimate perceptually consistent hue loci (PCHL) of out-of-gamut (OOG) colors of the content according to the CMC and a protection zone boundary;
       move each of the OOG colors along its PCHL to a final point inside the target gamut based on a perceptual hue preserved (PHP) color gamut transferring (CGT)

plan data, wherein the PHP CGT plan data includes target and source boundary information formed using the CMC and the protection zone boundary; and display an output in the CIE-1931 color space that is based on the move of each of the OOG colors.

17. The apparatus of claim 16, wherein:

metadata associated with the content includes the protection zone boundary and source gamut; and for each luminance level, a CMC connects intersections formed by PCHL with the target gamut boundary and source gamut boundary.

18. The apparatus of claim 17, wherein the process is further configured to:

select neighboring luminance layers from the CMC, wherein a luminance layer of the OOG color is between the neighboring luminance layers;

in each of the neighboring luminance layers, move the OOG color along its PCHL to an anchor point inside a corresponding target gamut; and obtain the final point inside the target gamut by color interpolation between anchor points.

19. The apparatus of claim 16, wherein PCHL is determined using a consistent hue loci (CHL) reference dataset.

20. The apparatus of claim 19, wherein the process is further configured to:

update the CMC according to perceptual requirement by changing geometric properties of the PHP CGT plan data.

\* \* \* \* \*